United States Patent
Ko et al.

(10) Patent No.: US 8,995,537 B2
(45) Date of Patent: Mar. 31, 2015

(54) METHOD AND APPARATUS FOR TRANSMITTING UPLINK CONTROL INFORMATION IN A WIRELESS COMMUNICATION SYSTEM

(75) Inventors: Hyun Soo Ko, Anyang-si (KR); Moon Il Lee, Anyang-si (KR); Ji Woong Jang, Anyang-si (KR); Jae Hoon Chung, Anyang-si (KR); Seung Hee Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 176 days.

(21) Appl. No.: 13/643,529

(22) PCT Filed: Apr. 27, 2011

(86) PCT No.: PCT/KR2011/003085
§ 371 (c)(1),
(2), (4) Date: Oct. 25, 2012

(87) PCT Pub. No.: WO2011/136559
PCT Pub. Date: Nov. 3, 2011

(65) Prior Publication Data
US 2013/0039398 A1    Feb. 14, 2013

Related U.S. Application Data

(60) Provisional application No. 61/328,627, filed on Apr. 27, 2010.

(51) Int. Cl.
H04L 27/00 (2006.01)
H04L 25/49 (2006.01)
H04L 1/08 (2006.01)
H04L 5/00 (2006.01)

(52) U.S. Cl.
CPC .............. *H04L 25/4915* (2013.01); *H04L 1/08* (2013.01); *H04L 5/0007* (2013.01); *H04L 5/0053* (2013.01)

USPC ........... 375/259; 375/295; 375/298; 375/300; 375/303; 375/308

(58) Field of Classification Search
USPC ......... 375/259, 295, 298, 300, 302, 303, 305, 375/308, 309
See application file for complete search history.

(56) References Cited

U.S. PATENT DOCUMENTS 8,009,662 B2 * 8/2011 Lee et al. .................. 370/350
8,185,802 B2 * 5/2012 Noguchi .................... 714/764
(Continued)

FOREIGN PATENT DOCUMENTS

| WO | 2008081004 | 7/2008 |
| WO | 2009099301 | 8/2009 |
| WO | 2009116816 | 9/2009 |

OTHER PUBLICATIONS

PCT International Application No. PCT/KR2011/003085, Written Opinion of the International Searching Authority dated Jan. 2, 2012, 14 pages.

*Primary Examiner* — Freshteh N Aghdam
(74) *Attorney, Agent, or Firm* — Lee, Hong, Degerman, Kang & Waimey

(57) ABSTRACT

The present invention relates to a wireless communication system, and more particularly, to a method and apparatus for transmitting uplink control information in a wireless communication system. A method for transmitting uplink control information in a wireless communication system according to one embodiment of the present invention comprises a step of repetition coding information bit of N-bit to generate an encoded bit; and a step of transmitting the encoded bit via a physical uplink shared channel, wherein bit inversion can be applied to the bit obtained by repeating the information bit of N-bit, on the basis of the number 1 contained in the information bit of N-bit.

8 Claims, 23 Drawing Sheets

(56) References Cited

U.S. PATENT DOCUMENTS

| | | | |
|---|---|---|---|
| 2007/0019753 A1* | 1/2007 | Kim | 375/260 |
| 2007/0098108 A1* | 5/2007 | Choi et al. | 375/295 |
| 2010/0239046 A1* | 9/2010 | Chun et al. | 375/295 |

* cited by examiner normal CP (a)

extended CP (b)

| 0 | 1 RI | 2 RI | 3 | 4 | 5 | 6 RI | 7 RI | 8 | 9 |

| 0 | 1 | 2 | 3 RI | 4 RI | 5 RI | 6 | 7 | 8 | 9 |

| 0 RI | 1 | 2 | 3 | 4 RI | 5 | 6 | 7 | 8 RI | 9 |

METHOD AND APPARATUS FOR TRANSMITTING UPLINK CONTROL INFORMATION IN A WIRELESS COMMUNICATION SYSTEM

CROSS-REFERENCE TO RELATED APPLICATIONS

This application is the National Stage filing under 35 U.S.C. 371 of International Application No. PCT/KR2011/003085, filed on Apr. 27, 2011, which claims the benefit of U.S. Provisional Application Ser. No. 61/328,627, filed on Apr. 27, 2010, the contents of which are all hereby incorporated by reference herein in their entirety.

TECHNICAL FIELD

The present description relates to a wireless communication system, and more specifically, to a method and apparatus for transmitting uplink control information in a wireless communication system.

BACKGROUND ART

Multi-antenna transmission is also called Multiple Input Multiple Output (MIMO). MIMO can increase the efficiency of data transmission and reception using multiple transmit antennas and multiple receive antennas. MIMO schemes include spatial multiplexing, transmit diversity, beamforming, etc. A MIMO channel matrix formed according to the number of receive antennas and the number of transmit antennas can be decomposed into a plurality of independent channels and each independent channel is called a layer or stream. The number of layers or streams or a spatial multiplexing rate is called a rank.

While the legacy 3GPP LTE system (e.g., 3GPP LTE release 8 or 9) supports downlink transmission through up to 4 transmit antennas, the 3GPP LTE-A standard discusses support of downlink transmission through up to 8 transmit antennas in 3GPP LTE-A system evolved from the 3GPP LTE system.

In addition, while the 3GPP LTE system supports uplink/downlink transmission based on a single carrier band, support of uplink/downlink transmission using a technique of aggregating a plurality of carriers to provide a wide bandwidth (i.e. carrier aggregation) is discussed for the 3GPP LTE-A system.

DISCLOSURE

Technical Problem

To efficiently perform downlink multi-antenna transmission, feedback information on a downlink channel can be transmitted from a receiver (e.g. UE) to a transmitter (e.g. eNB). Such feedback information may include rank information on the downlink channel. When downlink transmission using an extended antenna configuration compared to the legacy system and/or multiple carriers is supported, the size of rank information that needs to be fed back may increase. While the legacy system requires feedback of a rank indicator of up to 2 bits, it is necessary to define a detailed scheme for transmission of a rank indicator in an evolved system.

An object of the present invention is to provide a method for efficiently and correctly configuring control information transmitted on uplink. Specifically, the present invention provides a method and apparatus for transmitting rank information on a downlink channel through an uplink channel.

The technical problems to be solved by the present invention are not limited to the above technical problems and those skilled in the art may understand other technical problems from the following description.

Technical Solution

According to one aspect of the present invention, a method for transmitting uplink control information in a wireless communication system includes: repeatedly coding N information bits to generate encoded bits; and transmitting the encoded bits through a physical uplink shared channel (PUSCH), wherein bit inversion is applied to bits obtained by repeating the N information bits on the basis of the number of is included in the N information bits.

According to another aspect of the present invention, a UE transmitting uplink control information in a wireless communication system includes: a transmission module for transmitting an uplink signal to an eNB; a reception module for receiving a downlink signal from the eNB; and a processor for controlling the eNB including the reception module and the transmission module, wherein the processor is configured to repeatedly code N information bits to generate encoded bits and to transmit the encoded bits through a physical uplink shared channel (PUSCH), wherein bit inversion is applied to bits obtained by repeating the N information bits on the basis of the number of 1s included in the N information bits.

The following is applicable to the above embodiments of the present invention.

The N information bits may be repeated when the number of 1s included in the N information bits is an even number, and the N information bits may be inverted and then repeated when the number of 1s included in the N information bits is an odd number.

The bits obtained by repeating the N information bits may be located as MSBs or LSBs of the encoded bits.

The encoded bits may be interleaved on a bit-by-bit basis, on a bit block basis according to a modulation order, or on a repeated block basis.

The LSB of the encoded bits may be punctured according to the size of a transmission resource element (RE).

A constellation of bits obtained by modulating the encoded bits may be located farthest from the zero point of an I-Q plane.

N may be 3 or larger.

The N information bits may correspond to a rank indicator (RI) or HARQ-ACK/NACK information.

The N information bits may be [$O_0$ $O_1$ $O_2$], the bits obtained by repeating the N information bits may be [$O_3$ $O_4$ $O_5$], the encoded bits may be [$O_0$ $O_1$ $O_3$ $O_4$ $O_5$] in case of a modulation order of 2, the encoded bits may be [$O_0$ $O_1$ 1 1 $O_2$ $O_3$ 1 1 $O_4$ $O_5$ 1 1] in case of a modulation order of 4, and the encoded bits may be [$O_0$ $O_1$ 1 1 1 1 $O_2$ $O_3$ 1 1 1 1 $O_4$ $O_5$ 1 1 1 1] in case of a modulation order of 6.

The technical problems solved by the present invention are not limited to the above technical problems and those skilled in the art may understand other technical problems from the following description.

Advantageous Effects

According to an embodiment of the present invention, it is possible to provide a method for efficiently and correctly configuring control information transmitted on uplink. Additionally, it is possible to provide a method and apparatus for transmitting rank information on a downlink channel through an uplink channel.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 21 shows SC-FDMA symbol positions to which uplink control information is mapped on a PUSCH;

FIGS. 22 and 23 show symbol positions to which rank information is mapped;

BEST MODE

Figure 1:
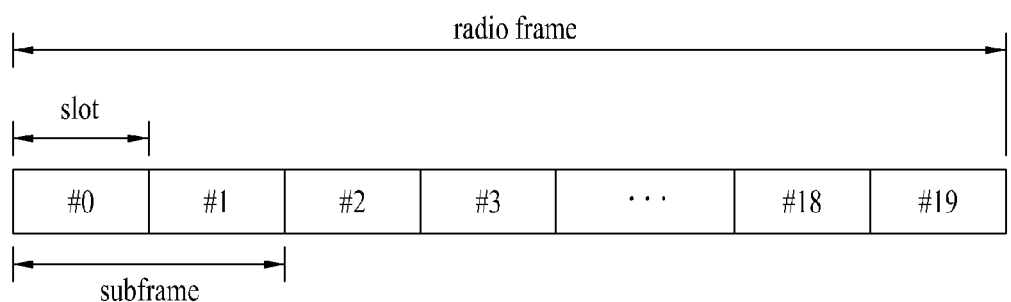
FIG. 1 illustrates an exemplary radio frame structure used in a 3GPP LTE system.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the embodiments of the present invention, a description is made, centering on a data transmission and reception relationship between a base station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc. The term 'UE' may be replaced with the term 'terminal', 'Mobile Station (MS)', 'Mobile Subscriber Station (MSS)', 'Subscriber Station (SS)', etc.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, $3^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (Wireless-MAN-OFDMA Reference System) and the IEEE 802.16m standard (WirelessMAN-OFDMA Advanced System). For clarity, this application focuses on the 3GPP LTE/LTE-A system. However, the technical features of the present invention are not limited thereto. For example, the technical spirit of the present invention is applicable to OFDM based mobile communication systems (e.g. IEEE 802.16m or 802.16x system) in addition to LTE-A.

FIG. 1 illustrates a radio frame structure in the 3GPP LTE system. A radio frame is divided into 10 subframes. Each subframe is further divided into two slots in the time domain. A unit time during which one subframe is transmitted is defined as Transmission Time Interval (TTI). For example, one subframe may be 1 ms in duration and one slot may be 0.5 ms in duration. A slot may include a plurality of Orthogonal Frequency Division Multiplexing (OFDM) symbols in the time domain. Because the 3GPP LTE system adopts OFDMA for downlink, an OFDM symbol represents one symbol period. A symbol may be referred to as an SC-FDMA symbol or symbol period on the uplink. A Resource Block (RB) is a resource allocation unit including a plurality of contiguous subcarriers in a slot. This radio frame structure is purely exemplary and thus the number of subframes in a radio frame, the number of slots in a subframe, or the number of OFDM symbols in a slot may vary.

Figure 2:
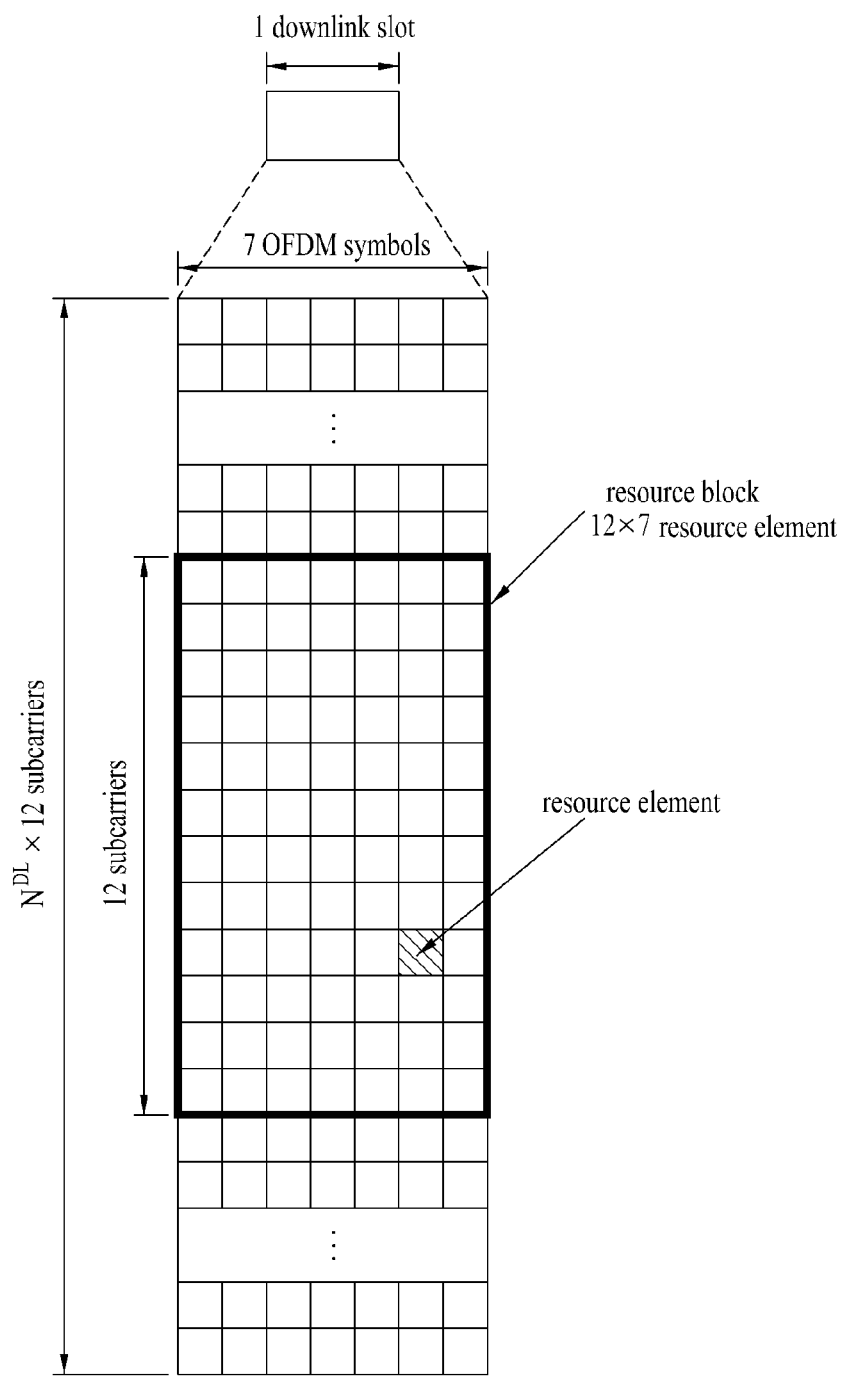
FIG. 2 illustrates a resource grid in a downlink slot.

FIG. 2 illustrates the structure of a resource grid in a downlink slot. A downlink slot includes 7 OFDM symbols in the time domain and an RB includes 12 subcarriers in the frequency domain, which does not limit the scope and spirit of the present invention. For example, a downlink slot includes 7 OFDM symbols in case of a normal Cyclic Prefix (CP), whereas a downlink slot includes 6 OFDM symbols in case of an extended CP. Each element of the resource grid is referred to as a Resource Element (RE). An RB includes 12×7 REs. The number of RBs in a downlink slot, $N^{DL}$ depends on a downlink transmission bandwidth. An uplink slot may have the same structure as a downlink slot.

Figure 3:
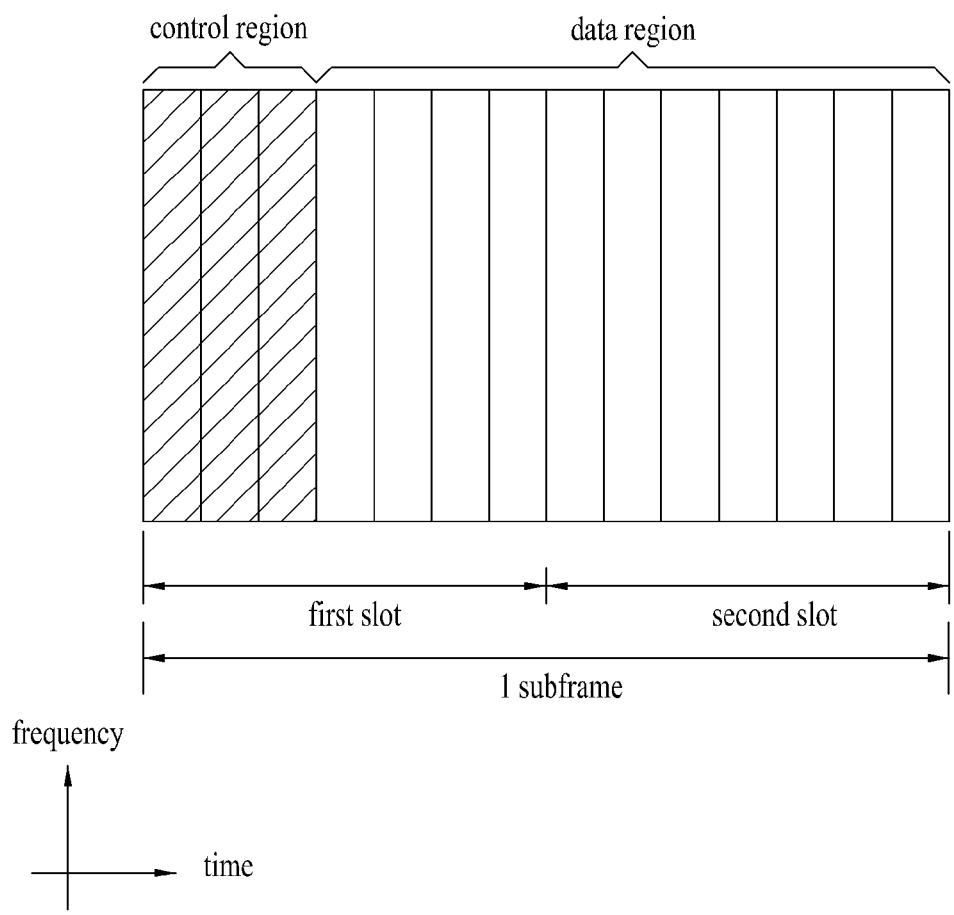
FIG. 3 illustrates a downlink subframe structure.

FIG. 3 illustrates a downlink subframe structure. Up to three OFDM symbols at the start of the first slot in a downlink subframe are used for a control region to which control channels are allocated and the other OFDM symbols of the downlink subframe are used for a data region to which a Physical Downlink Shared Channel (PDSCH) is allocated. Downlink control channels used in the 3GPP LTE system include a Physical Control Format Indicator Channel (PCFICH), a Physical Downlink Control Channel (PDCCH), and a Physical Hybrid automatic repeat request (ARQ) Indicator Channel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI includes uplink or downlink scheduling information, or uplink transmission power control commands for UE groups. The PDCCH delivers information about resource allocation and a transport format for a Downlink Shared Channel (DL-SCH), resource allocation information about an Uplink Shared Channel (UL-SCH), paging information of a Paging Channel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregation of one or more consecutive Control Channel Elements (CCEs). A CCE is a logical allocation unit used to provide a PDCCH at a coding rate based on the state of a radio channel. A CCE includes a set of REs. The format of a PDCCH and the number of available bits for the PDCCH are determined according to the correlation between the number of CCEs and a coding rate provided by the CCEs. An eNB determines the PDCCH format according to DCI transmitted to a UE and attaches a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH carries a paging message, the CRC of the PDCCH may be masked by a Paging Indicator Identifier (P-RNTI). If the PDCCH carries system information (particularly, a System Information Block (SIB)), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
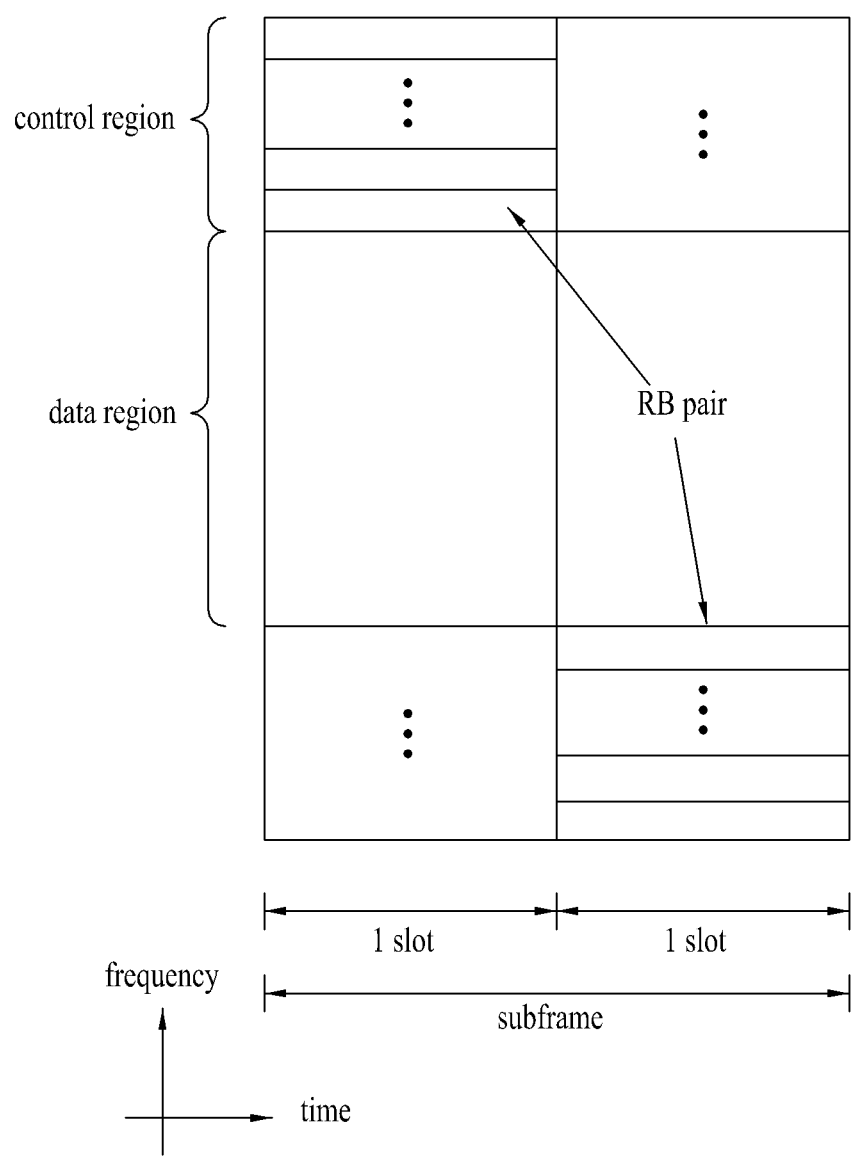
FIG. 4 illustrates an uplink subframe structure.

FIG. 4 illustrates an uplink subframe structure. An uplink subframe may be divided into a control region and a data region in the frequency domain. A Physical Uplink Control Channel (PUCCH) carrying uplink control information is allocated to the control region and a Physical Uplink Shared Channel (PUSCH) carrying user data is allocated to the data region. To maintain single-carrier characteristics, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Uplink Multiple Access Schemes

A description will be given below of uplink multiple access schemes.

First of all, an SC-FDMA transmission scheme will be described. SC-FDMA is also called DFT-s-OFDMA, different from later-described clustered DFT-s-OFDMA.

SC-FDMA is a transmission scheme that keeps a Peak-to-Average Power Ratio (PARP) or Cube Metric (CM) value low and efficiently transmits a signal, avoiding the non-linear distortion area of a power amplifier. PAPR is a parameter representing waveform characteristics, computed by dividing the peak amplitude of a waveform by a time-averaged Root Mean Square (RMS) value. CM is another parameter representing a value that PAPR represents. PAPR is associated with a dynamic range that a power amplifier should support in a transmitter. That is, to support a high-PAPR transmission scheme, the dynamic range (or linear area) of the power amplifier needs to be wide. As a power amplifier has a wider dynamic range, it is more expensive. Therefore, a transmission scheme that maintains a PAPR value low is favorable for uplink transmission. In this context, due to the advantage of low PAPR, SC-FDMA is employed as an uplink transmission scheme in the current 3GPP LTE system.

Figure 5:
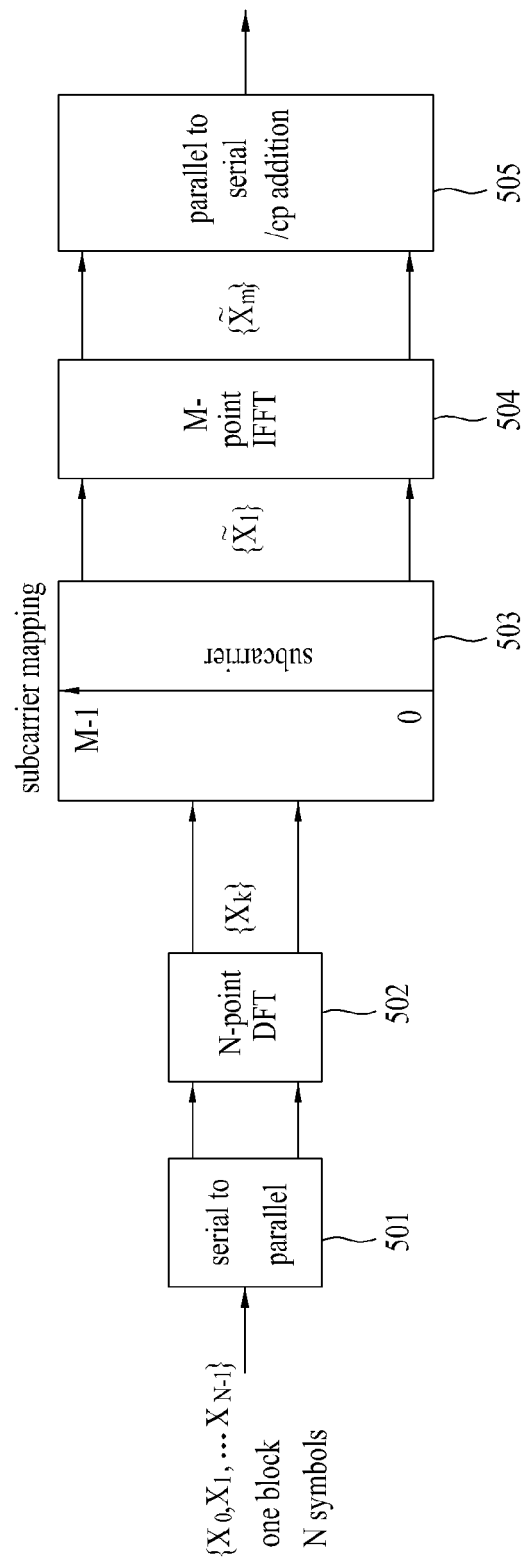
FIG. 5 is a block diagram of a Single Carrier-Frequency Division Multiple Access (SC-FDMA) transmitter.

FIG. 5 is a block diagram of an SC-FDMA transmitter.

A serial-to-parallel converter 501 converts one block of N symbols input to the transmitter to parallel signals. An N-point DFT module 502 spreads the parallel signals and a subcarrier mapping module 503 maps the spread parallel signals to a frequency region. Each subcarrier signal is a linear combination of N symbols. An M-point Inverse Fast Fourier Transform (IFFT) module 504 converts the mapped frequency signals to time signals. A parallel-to-serial converter 505 converts the time signals to a serial signal and adds a CP to the serial signal. The DFT processing of the N-point DFT module 502 compensates for the effects of the IFFY processing of the M-point IFFY module 504 to a certain degree. The signals input to the DFT module 502 have a low PAPR which is increased after the DFT processing. The IFFY signals output from the IFFY module 504 may have a low PAPR again.

Figure 6:
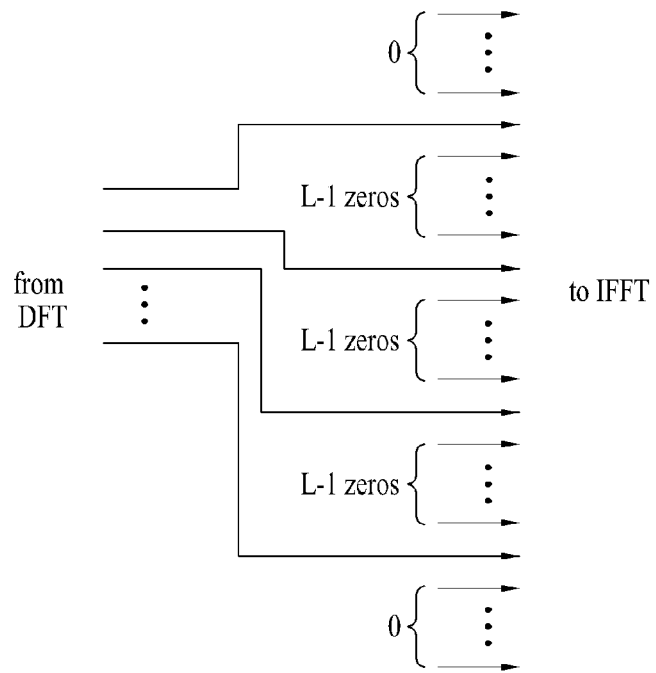
FIG. 6 illustrates methods for mapping signals output from a Discrete Frequency Transform (DFT) module illustrated in FIG. 5 to a frequency region.

FIG. 6 illustrates methods for mapping signals output from the DFT module 502 to a frequency region. A signal output from the SC-FDMA transmitter may satisfy single-carrier characteristics by performing one of two mapping schemes illustrated in FIG. 6. FIG. 6(a) illustrates a localized mapping scheme in which the signals output from the DFT module 502 are mapped only to a specific part of a subcarrier region. FIG. 6(b) illustrates a distributed mapping scheme in which the signals output from the DFT module 502 are mapped across a total subcarrier region. The legacy 3GPP LTE standard (e.g. release 8) uses localized mapping.

Figure 7:
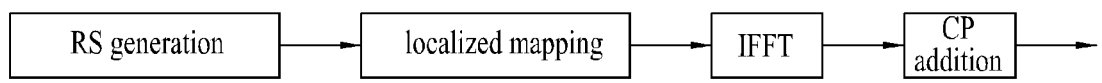
FIG. 7 is a block diagram illustrating Demodulation Reference Signal (DM-RS) transmission in case of SC-FDMA transmission.

FIG. 7 is a block diagram illustrating transmission of a Reference signal (RS) for use in demodulating a signal transmitted in SC-FDMA. According to the legacy 3GPP LTE standard (e.g. release 8), while a time signal of data is converted to a frequency signal by DFT, mapped to subcarriers, IFFT-processed, and then transmitted (refer to FIG. 5), an RS is generated directly in the frequency domain without DFT processing (701), mapped to subcarriers (702), IFFT-processed (703), attached with a CP, and then transmitted.

Figure 8:
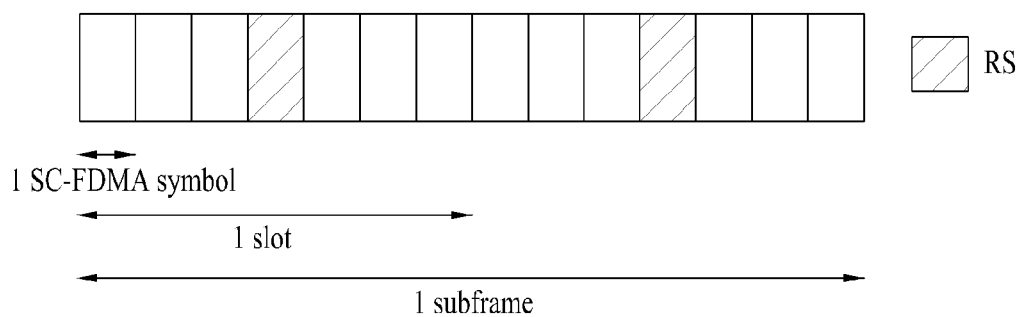
FIG. 8 illustrates the positions of symbols to which RSs are mapped in an SC-FDMA subframe structure.
Figure 8:
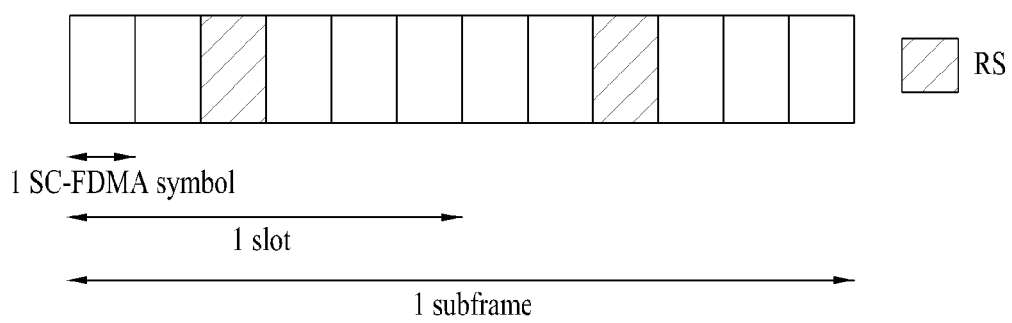

FIG. 8 illustrates the positions of symbols to which RSs are mapped in an SC-FDMA subframe structure. FIG. 8(a) illustrates a case where an RS is positioned in the $4^{th}$ SC-FDMA symbol of each of two slots in a subframe, when a normal CP is used. FIG. 8(b) illustrates a case where an RS is positioned in the $3^{rd}$ SC-FDMA symbol of each of two slots in a subframe, when an extended CP is used.

With reference to FIGS. 9 to 12, clustered DFT-s-OFDMA will be described. Clustered DFT-s-OFDMA is a modification to the above-described SC-FDMA, in which a DFT signal is divided into a plurality of sub-blocks and mapped to positions apart from each other in the frequency domain.

Figure 9:
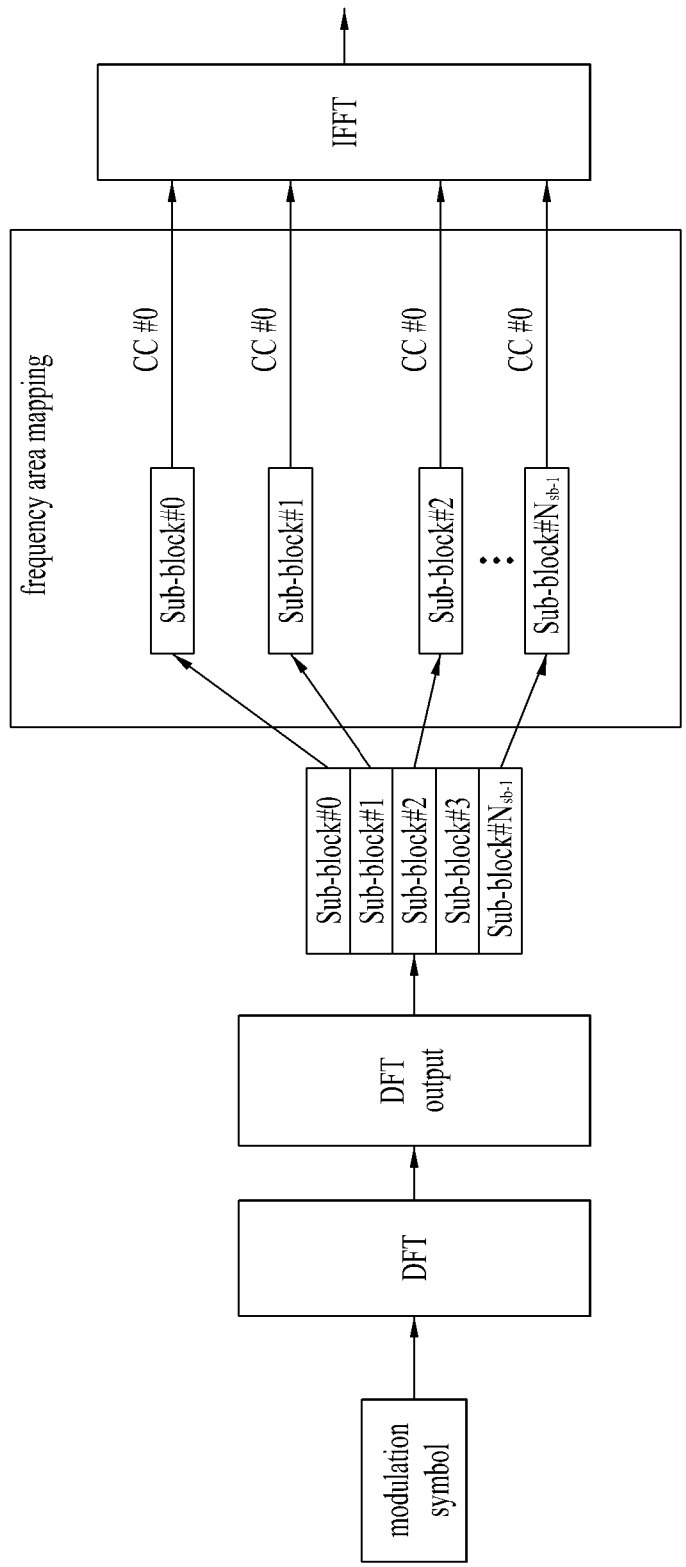
FIG. 9 illustrates a clustered Discrete Frequency Transform-spread-Orthogonal Frequency Division Multiple Access (DFT-s-OFDMA) scheme in a single carrier system.

FIG. 9 illustrates a clustered DFT-s-OFDMA scheme in a single carrier system. For example, a DFT output may be divided in Nsb sub-blocks (sub-block #0 to sub-block #Nsb−1). The sub-blocks, sub-block #0 to sub-block #Nsb−1 are mapped to positions spaced from each other in the frequency domain on a single carrier (e.g. a carrier having a bandwidth of 20 MHz). Each sub-block may be mapped to a frequency region in the localized mapping scheme.

Figure 10:
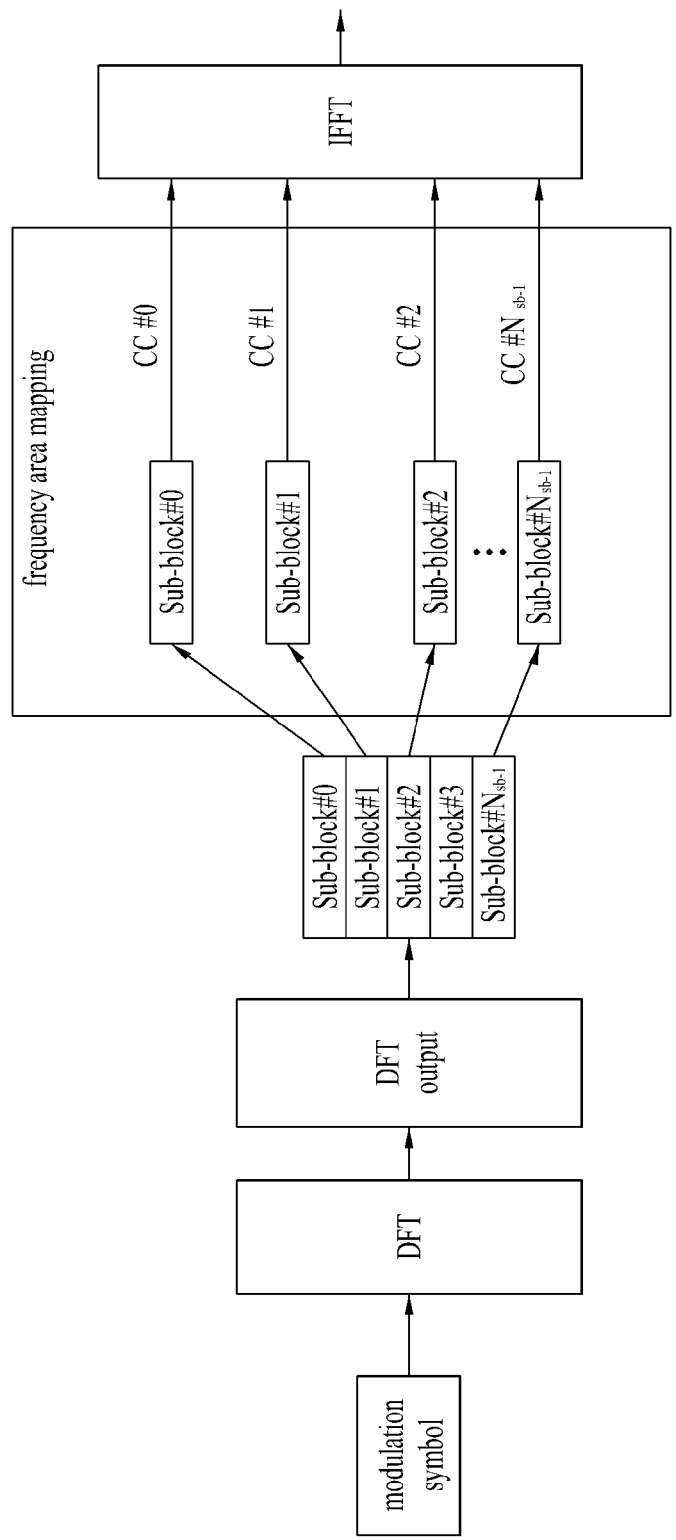
FIGS. 10, 11 and 12 illustrate clustered DFT-s-OFDMA schemes in a multiple antenna system.
Figure 11:
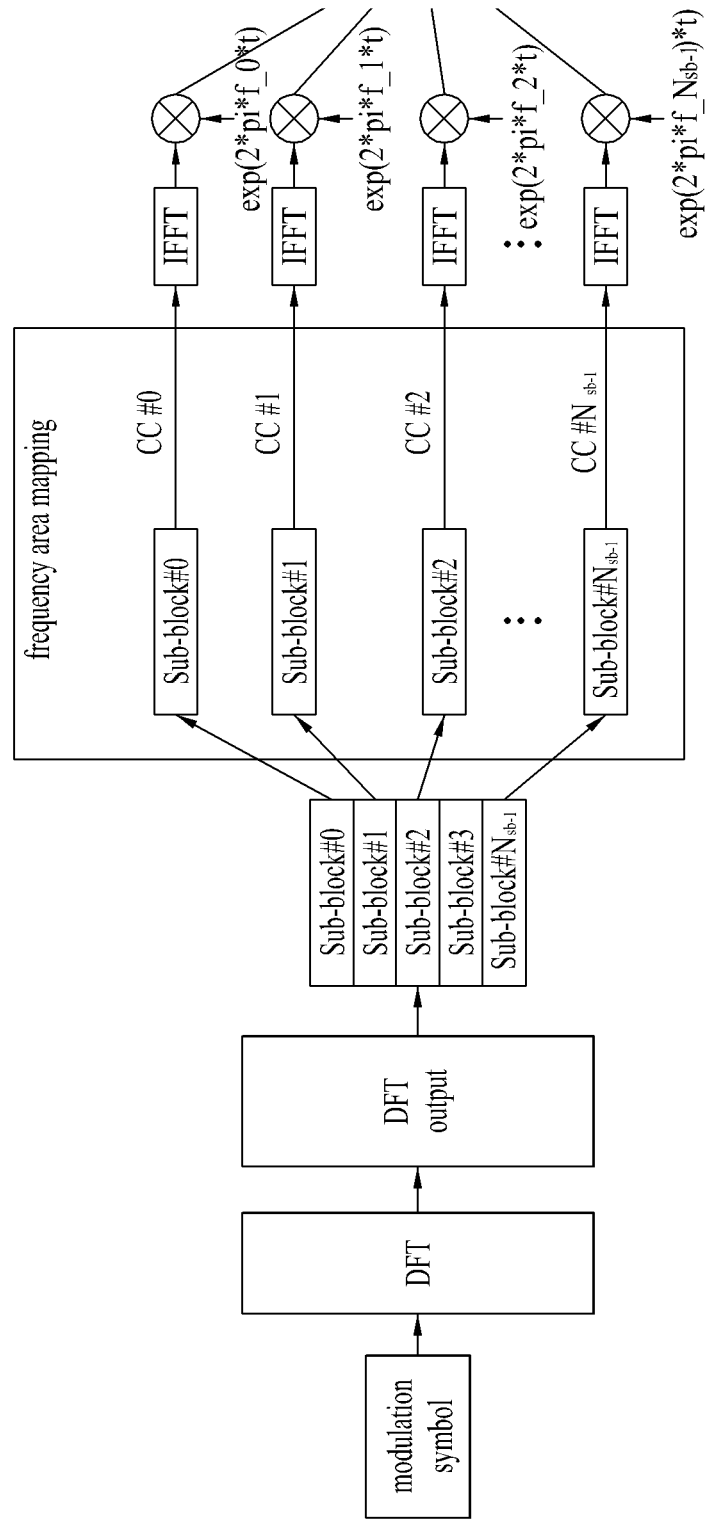

FIGS. 10 and 11 illustrate clustered DFT-s-OFDMA schemes in a multiple antenna system.

FIG. 10 illustrates an example of generating a signal through one IFFT module, when multiple carriers are contiguously configured (i.e. the respective frequency bands of the multiple carriers are contiguous) and a specific subcarrier spacing is aligned between adjacent carriers. For example, a DFT output may be divided into Nsb sub-blocks (sub-block #0 to sub-block #Nsb−1) and the sub-blocks, sub-block #0 to sub-block #Nsb−1 may be mapped, in a one-to-one correspondence, to the component carriers, component carrier #0 to component carrier #Nsb−1 (each component carrier may have, for example, a bandwidth of 20 MHz). Each sub-block may be mapped to a frequency region in the localized mapping scheme. The sub-blocks mapped to the respective component carriers may be converted to a time signal through a single IFFT module.

FIG. 11 illustrates an example of generating signals through a plurality of IFFT modules, when multiple carriers are non-contiguously configured (i.e. the respective frequency bands of the multiple carriers are non-contiguous). For example, a DFT output may be divided into Nsb sub-blocks (sub-block #0 to sub-block #Nsb−1) and the sub-blocks, sub-block #0 to sub-block #Nsb−1 may be mapped, in a one-to-one correspondence, to the component carriers, component carrier #0 to component carrier #Nsb−1 (each component carrier may have, for example, a bandwidth of 20 MHz). Each sub-block may be mapped to a frequency region in the localized mapping scheme. The sub-blocks mapped to the respective component carriers may be converted to time signals through respective IFFT modules.

If the clustered DFT-s-OFDMA scheme for a single carrier illustrated in FIG. 9 is intra-carrier DFT-s-OFDMA, it may be said that the clustered DFT-s-OFDMA schemes for multiple carriers illustrated in FIGS. 10 and 11 are inter-carrier DFT-s-OFDMA. Intra-carrier DFT-s-OFDMA and inter-carrier DFT-s-OFDMA may be used in combination.

Figure 12:
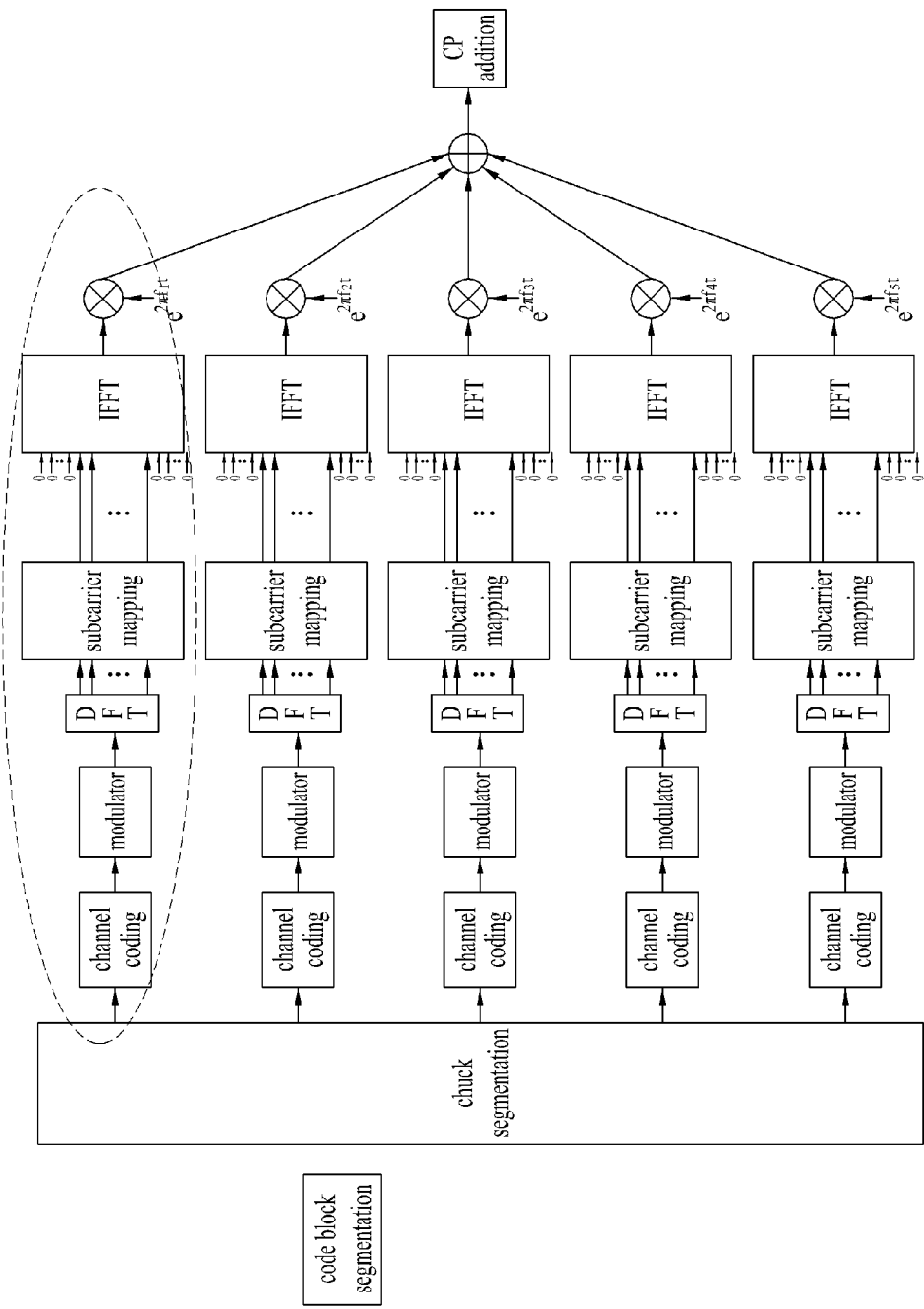

FIG. 12 illustrates a chunk-specific DFT-s-OFDMA scheme in which DFT, frequency mapping, and IFFT are performed on a chunk basis. Chunk-specific DFT-s-OFDMA may also be referred to as Nx SC-FDMA. A code block resulting from code block segmentation is divided into chunks and the chunks are channel-encoded and modulated individually. The modulated signals are subjected to DFT, frequency mapping, and IFFT and the IFFT signals are summed and then added with a CP in the same manner as described with reference to FIG. 5. The Nx SC-FDMA scheme illustrated in FIG. 12 is applicable to both a case of contiguous multiple carriers and a case of non-contiguous multiple carriers.

MIMO System

MIMO does not depend on a single antenna path to receive a whole message. Rather, it completes the message by combining data fragments received through a plurality of antennas. Because MIMO can increase data rate within a certain area or extend system coverage at a given data rate, it is considered as a promising future-generation mobile communication technology that may find its use in a wide range including mobile terminals, relays, etc. MIMO can overcome a limited transmission capacity caused by increased data communication.

MIMO schemes can be categorized into spatial multiplexing and spatial diversity depending on whether the same data is transmitted or not. In spatial multiplexing, different data is transmitted simultaneously through a plurality of transmit/receive antennas. As a transmitter transmits different data through different Tx antennas and a receiver distinguishes the transmission data by appropriate interference cancellation and signal processing, a transmission rate can be increased by as much as the number of transmission antennas. Spatial diversity is a scheme that achieves transmit diversity by transmitting the same data through a plurality of Tx antennas. Space time channel coding is an example of spatial diversity. Since the same data is transmitted through a plurality of Tx antennas, spatial diversity can maximize a transmission diversity gain (a performance gain). However, spatial diversity does not increase transmission rate. Rather, it increases transmission reliability using a diversity gain. These two schemes may offer their benefits when they are appropriately used in combination. In addition, MIMO schemes may be categorized into open-loop MIMO (or channel-independent MIMO) and closed-loop MIMO (or channel-dependent MIMO) depending on whether a receiver feeds back channel information to a transmitter.

Figure 13:
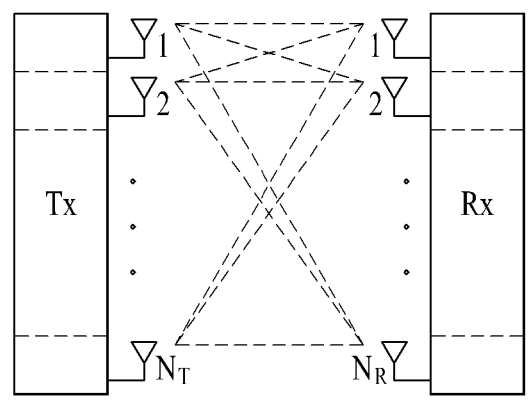
FIG. 13 illustrates a MIMO transmission scheme.
Figure 13:
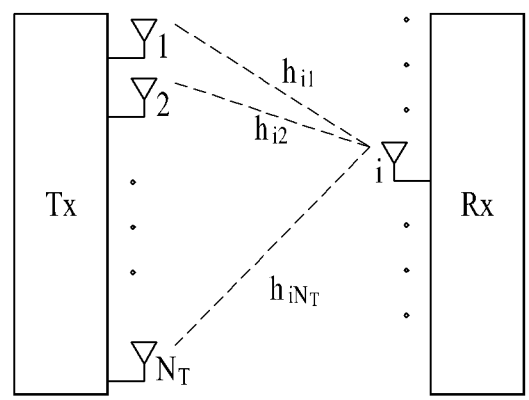

FIG. 13 illustrates the configuration of a typical MIMO communication system. Referring to FIG. 13(a), when both the number of Tx antennas and the number of Rx antennas respectively to $N_T$ and $N_R$, a theoretical channel transmission capacity is increased, compared to use of a plurality of antennas at only one of a transmitter and a receiver. The channel transmission capacity is increased in proportion to the number of antennas. Therefore, transmission rate and frequency efficiency can be increased remarkably. Given a maximum transmission rate $R_o$ that may be achieved with a single antenna, the transmission rate may be increased, in theory, to the product of $R_o$ and a transmission rate increase rate $R_i$ illustrated in Equation 1 due to an increase in channel transmission capacity in case of multiple antennas.

$$R_i = \min(N_T, N_R) \quad \text{[Equation 1]}$$

For instance, a MIMO communication system with 4 Tx antennas and 4 Rx antennas may achieve a four-fold increase in transmission rate theoretically, relative to a single-antenna system.

Communication in a MIMO system will be described in detail through mathematical modeling. As illustrated in FIG. 13(a), it is assumed that $N_T$ Tx antennas and $N_R$ Rx antennas exist. Regarding a transmission signal, up to $N_T$ pieces of information can be transmitted through the $N_T$ Tx antennas, as expressed as the following vector.

$$s = [s_1, s_2, \ldots, s_{N_T}]^T \quad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [P s_1, P s_2, \ldots, P s_{N_T}]^T \quad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmitted signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmitted signals $x_1, x_2, \ldots, x_{N_T}$ are represented as a vector X, which may be determined by Equation 5. Herein, $w_{ij}$ denotes a weight between an $i^{th}$ Tx antenna and a $j^{th}$ piece of information. W is called a weight matrix or a precoding matrix.

$$x = \begin{bmatrix} x_1 \\ x_2 \\ \vdots \\ x_i \\ \vdots \\ x_{N_T} \end{bmatrix} \quad \text{[Equation 5]}$$

$$= \begin{bmatrix} w_{11} & w_{12} & \cdots & w_{1N_T} \\ w_{12} & w_{12} & \cdots & w_{2N_T} \\ \vdots & & \ddots & \\ w_{i2} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

Given $N_R$ Rx antennas, signals received at the respective Rx antennas, $y_1, y_2, \ldots, y_{N_R}$ may be represented as the following vector.

$$y = [y_1, y_2, \ldots, y_{N_R}]^T \quad \text{[Equation 6]}$$

When channels are modeled in the MIMO communication system, they may be distinguished according to the indexes of Tx and Rx antennas and the channel between a $j^{th}$ Tx antenna and an $i^{th}$ Rx antenna may be represented as $h_{ij}$. It is to be noted herein that the index of the Rx antenna precedes that of the Tx antenna in $h_{ij}$.

The channels may be represented as vectors and matrices by grouping them. The vector representation of channels may be carried out in the following manner. FIG. 13(b) illustrates channels from $N_T$ Tx antennas to an $i^{th}$ Rx antenna.

As illustrated in FIG. 13(b), channels from the $N_T$ Tx antennas to an $i^{th}$ Rx antenna may be expressed as $$h_i^T = [h_{i1}, h_{i2}, \ldots, h_{iN_T}] \quad \text{[Equation 7]}$$

Also, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & \ddots & \\ h_{N_R 1} & h_{N_R 2} & \cdots & h_{N_R N_T} \end{bmatrix} \quad \text{[Equation 8]}$$

Actual channels experience the above channel matrix H and then are added with Additive White Gaussian Noise (AWGN). The AWGN $n_1, n_2, \ldots, n_{N_R}$ added to the $N_R$ Rx antennas is given as the following vector.

$$n = [n_1, n_2, \ldots, n_{N_R}]^T \quad \text{[Equation 9]}$$

From the above modeled equations, the received signal is given as $$y = \begin{bmatrix} y_1 \\ y_2 \\ \vdots \\ y_i \\ \vdots \\ y_{N_R} \end{bmatrix} \quad \text{[Equation 10]}$$

-continued $$= \begin{bmatrix} h_{11} & h_{12} & \cdots & h_{1N_T} \\ h_{12} & h_{12} & \cdots & h_{2N_T} \\ \vdots & & \ddots & \vdots \\ h_{i2} & h_{i2} & \cdots & h_{iN_T} \\ \vdots & & \ddots & \vdots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

In the meantime, the numbers of rows and columns in the channel matrix H representing channel states are determined according to the numbers of Tx and Rx antennas. The number of rows is identical to that of Rx antennas, $N_R$ and the number of columns is identical to that of Tx antennas, $N_T$. Thus, the channel matrix H is of size $N_R \times N_T$. In general, the rank of a matrix is defined as the smaller between the numbers of independent rows and columns. Accordingly, the rank of the matrix is not larger than the number of rows or columns. For example, the rank of the matrix H, rank (H) is limited as follows.

$$\text{rank}(H) \leq \min(N_T, N_R) \qquad \text{[Equation 11]}$$

A description will be given of the configuration of a MIMO-OFDM system.

Figure 14:
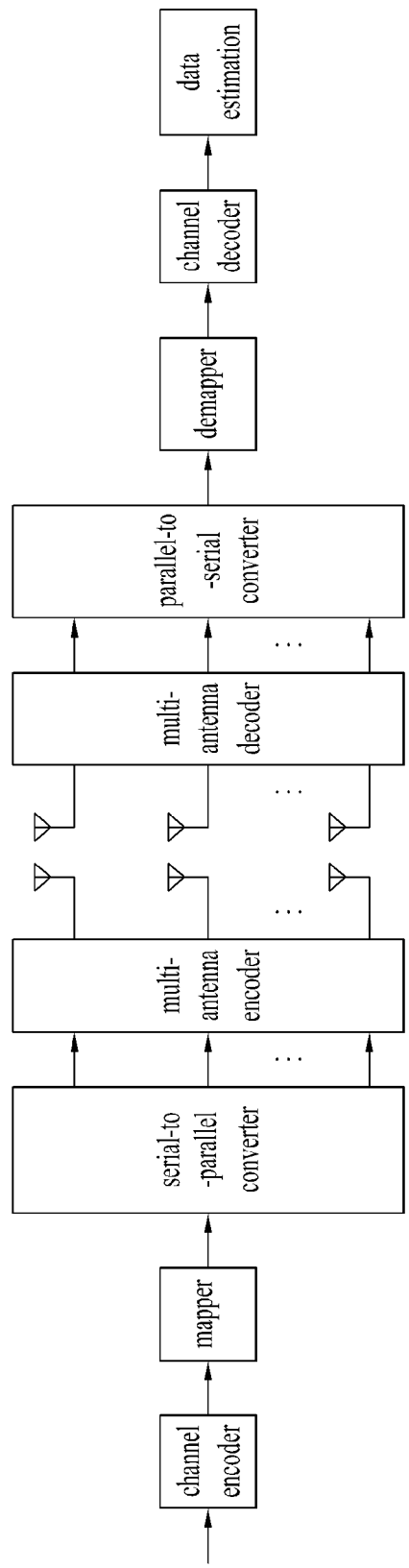
FIG. 14 illustrates the configuration of a MIMO-OFDM system.

FIG. 14 illustrates the configuration of a MIMO-OFDM system having multiple Tx/Rx antennas. In FIG. 14, a channel encoder reduces channel effects or noise effects by adding a redundancy bit to a data bit. A serial-to-parallel converter converts serial data into parallel data. A mapper converts data bit information into data symbol information. A multi-antenna encoder converts data symbols into a space-time signal. In case of multi-antenna structure, Tx antennas transmit the space-time signal to a channel and Rx antennas receive the space-time signal from the channel. A multi-antenna decoder converts the received space-time signal into data symbols and a demapper converts the data symbols into bit information. A parallel-to-serial converter converts parallel data into serial data. A channel decoder decodes a channel code and estimates data.

Figure 15:
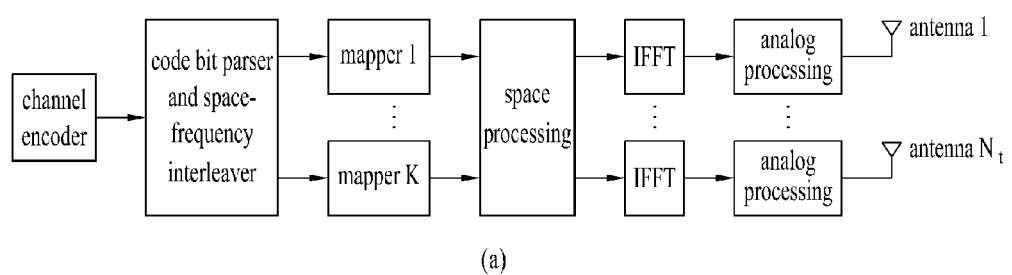
FIG. 15 illustrates configurations of transmitters of SCW and MCW MIMO-OFDM systems.
Figure 15:
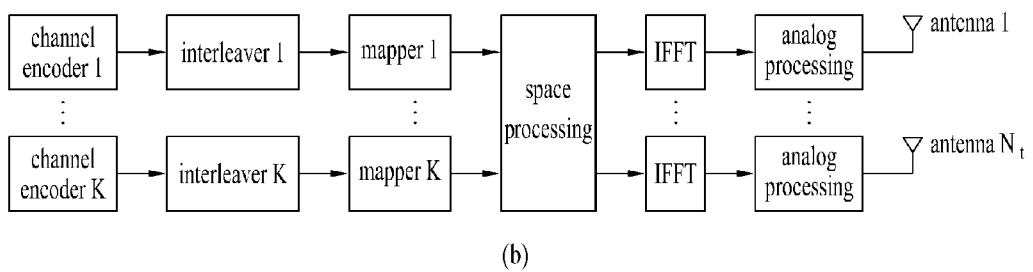

In this MIMO-OFDM system, one or several codewords can be used spatially according to a spatial multiplexing rate. A case in which one codeword is used spatially corresponds to a single codeword (SCW) structure, whereas a case in which a plurality of codewords is used spatially corresponds to a multiple codeword (MCW) structure. FIG. 15(a) shows a transmitter of a MIMO-OFDM system having the SCW structure and FIG. 15(b) shows a transmitter of a MIMO-OFDM system having the MCW structure.

Transmission of Control Information on PUSCH

Figure 16:
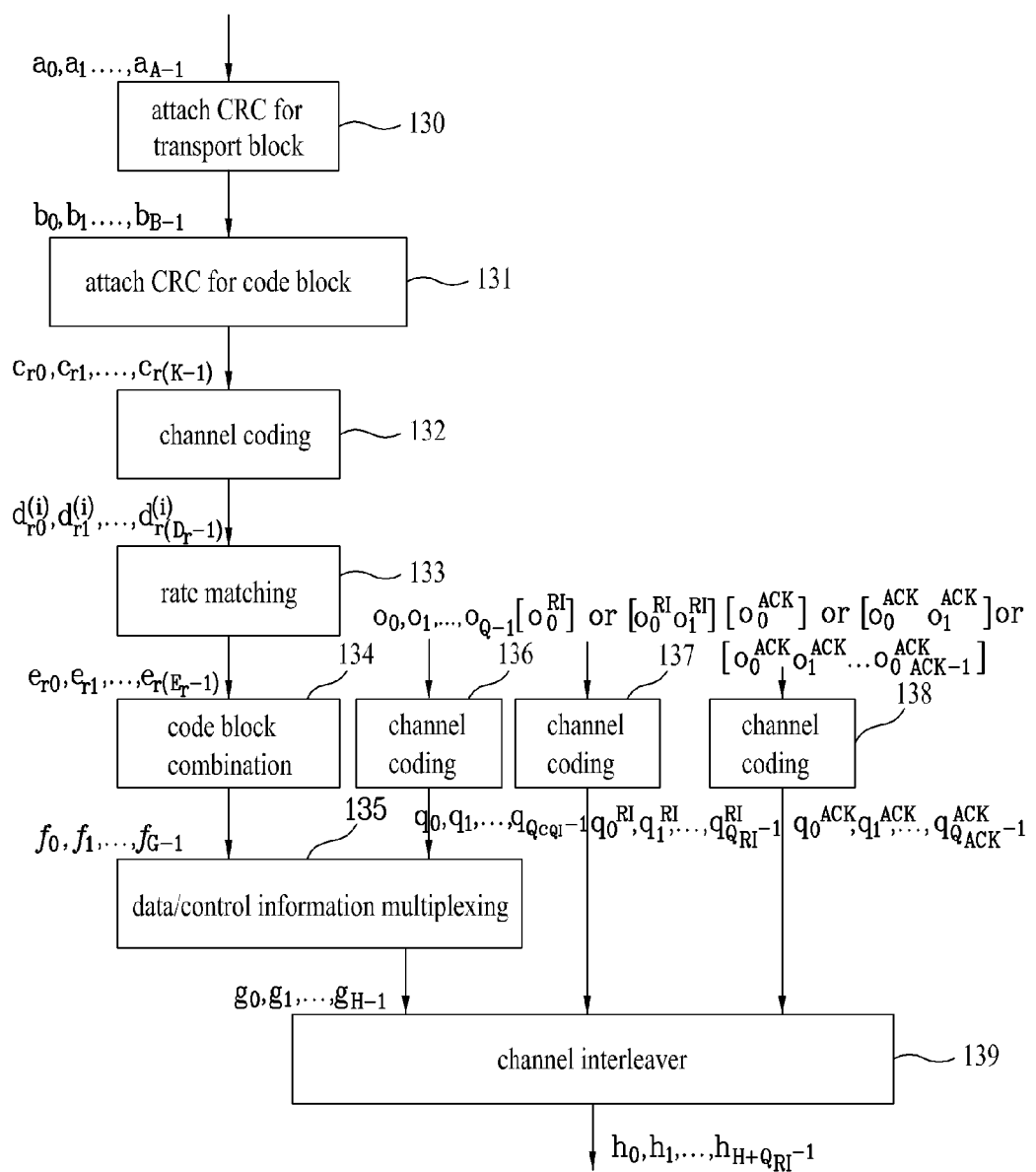
FIG. 16 is a block diagram illustrating a procedure of processing a transmission channel for a physical uplink shared channel.

FIG. 16 is a block diagram illustrating a transmission channel processing procedure for a PUSCH. Referring to FIG. 16, cyclic redundancy check (CRC) for TB is attached to transport blocks (TBs) of data information multiplexed with control information, which will be transmitted through an uplink (130). The TBs are divided into code blocks (CBs) according to size, and CRC for CB is attached to the CBs (131). Channel coding is performed on the CRC-added CBs (132). The channel-coded data is subjected to rate matching (133). The CBs are combined (134) and then multiplexed with CQI/PMI (Channel Quality Information/Precoding Matrix Index) (135).

The CQI/PMI are channel-coded separately from the data (136). The channel-coded CQI/PMI is multiplexed with the data (135). An RI (Rank Indicator) is also channel-coded separately from the data (137). ACK/NACK (Acknowledgement/Negative Acknowledgement) information is channel-coded separately from the data, CQI/PMI and RI (138). Channel interleaving is performed on the multiplexed data and CQI/PMI, the separately channel-coded RI and ACK/NACK to generate an output signal (139).

Figure 17:
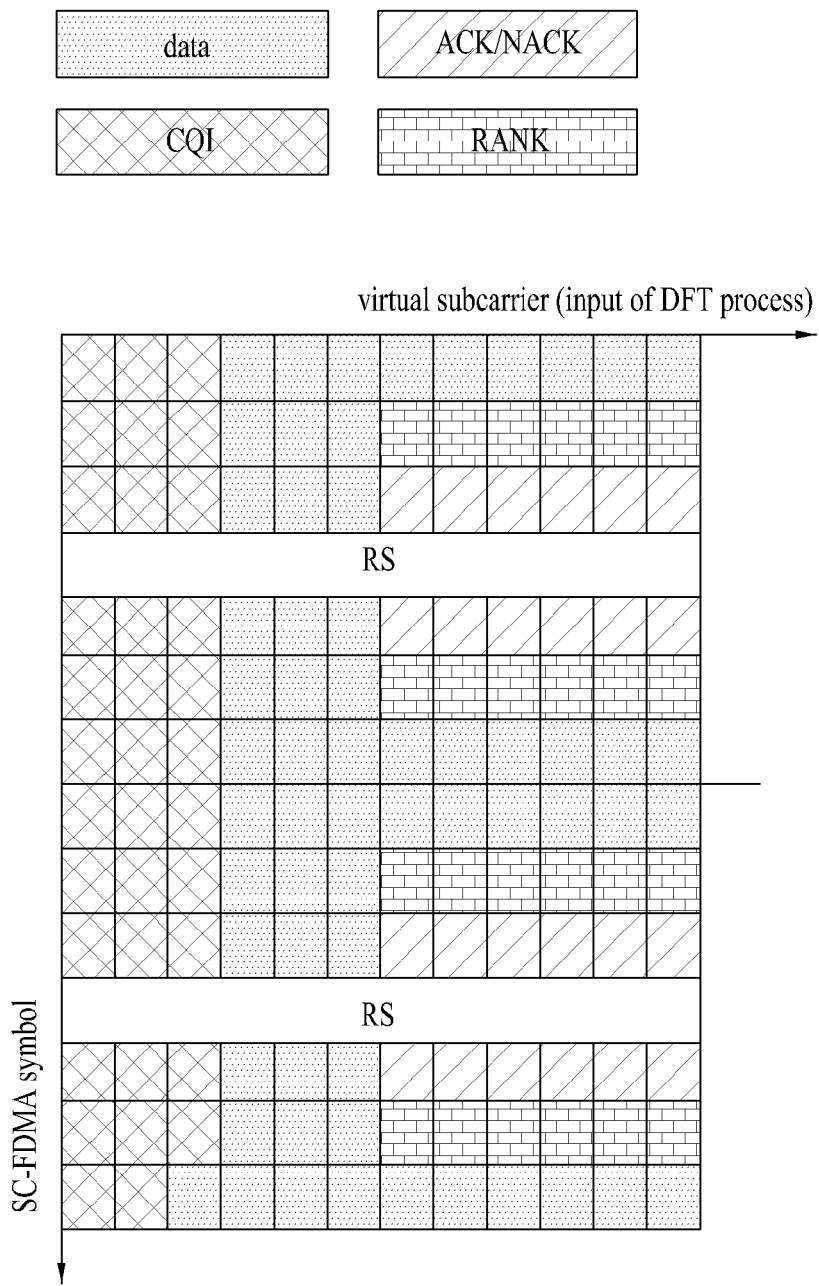
FIG. 17 illustrates a physical resource mapping method for transmission of uplink data and uplink control information.

FIG. 17 illustrates a physical resource mapping method for transmission of uplink data and uplink control information (UCI).

Referring to FIG. 17, CQI/PMI and data are mapped to REs in a time-first manner. Encoded ACK/NACK is located adjacent to DM RS (Demodulation Reference Signal) symbols through puncturing and an RI is mapped to REs adjacent to REs corresponding to the ACK/NACK. Resources for the RI and ACK/NACK may occupy up to 4 SC-FDMA symbols. When data and control information are simultaneously transmitted over a PUSCH, the data and control information are mapped in the order of RI, CQI/PMI and data which are contiguous to each other, and ACK/NACK. That is, the RI is mapped first and then the contiguous CQI/PMI and data are mapped to REs other than REs to which the RI is mapped in a time-first manner. The ACK/NACK is mapped to REs by puncturing the contiguous CQI/PMI and data that have been mapped.

Single carrier characteristics can be satisfied by multiplexing the data and uplink control information such as CQI/PMI, etc., as described above, to thereby achieve uplink transmission that maintains a low CM (Cubic Metric).

Figure 18:
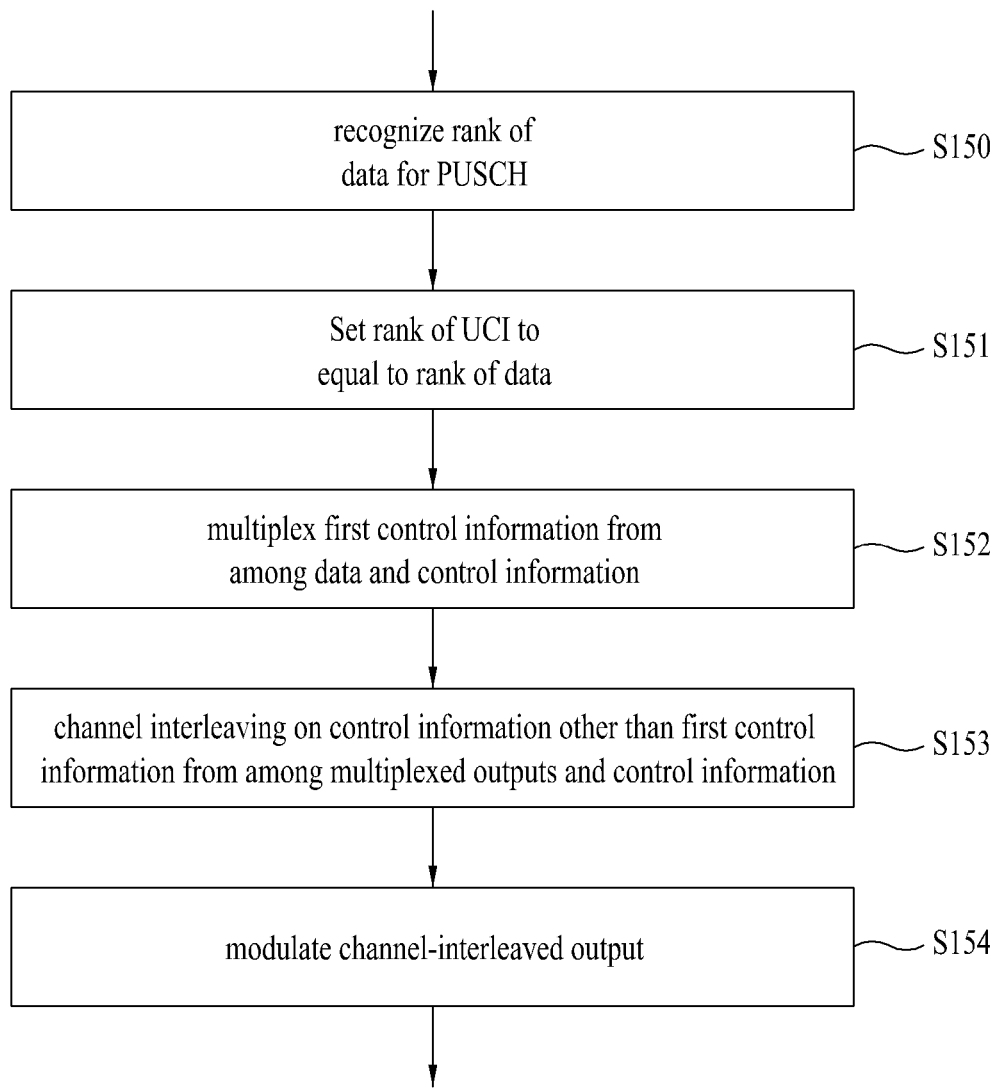
FIG. 18 is a flowchart illustrating a method for efficiently multiplexing data and uplink control information on a physical uplink shared channel.

FIG. 18 is a flowchart illustrating a method for efficiently multiplexing data and uplink control information on a PUSCH.

As shown in FIG. 18, user equipment (UE) recognizes the rank of data of a PUSCH (S150). The UE sets the rank of uplink control information (CQI, ACK/NACK and RI) to equal to that of the data (S151). The UE multiplexes the data and the uplink control information (S152). After mapping the data and CQI in a time-first manner, the UE may perform channel interleaving to aid in mapping the RI to designated REs and mapping the ACK/NACK to REs adjacent to a DM RS through puncturing (S153).

The data and control channel are modulated according to an MCS table through QPSK, 16QAM, 64QAM or the like (S154). This modulation step may be performed at a different time (e.g. the modulation can be performed before multiplexing of the data and control channel). Channel interleaving may be performed on a codeword basis or on a layer basis.

Figure 19:
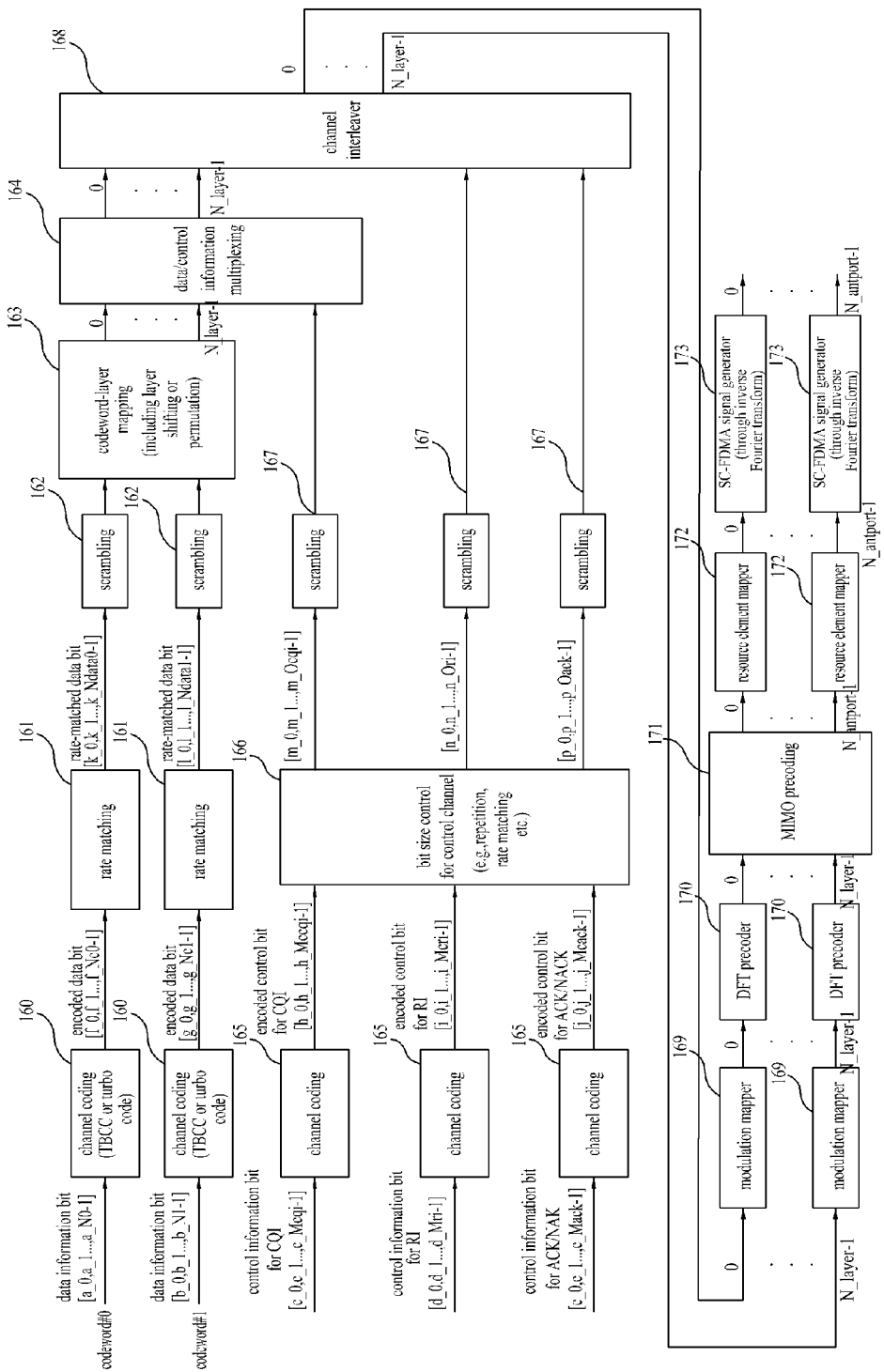
FIG. 19 is a block diagram illustrating a method for generating transmission signals of data and a control channel.

FIG. 19 is a block diagram illustrating a method for generating a transmission signal containing data and control information. In FIG. 19, the locations of blocks may vary.

Given two codewords, channel coding is performed on each codeword (160) and rate matching is carried out according to a given MCS level and resource size (161). Then, encoded bits may be scrambled in a cell-specific, UE-specific or codeword-specific manner (S162).

Subsequently, codeword-to-layer mapping is performed (163). The codeword-to-layer mapping may include layer shift or permutation.

FIG. 17 illustrates a codeword-to-layer mapping method. Codeword-to-layer mapping may be performed using the rule shown in FIG. 17. A precoding position in FIG. 17 may be different from that in FIG. 13.

Channel information such as CQI, RI and ACK/NACK is channel-coded according to specification (165). The CQI, RI and ACK/NACK may be coded using the same channel code for all codewords or using different channel codes for the respective codewords.

The number of encoded bits may be changed by a bit size controller (166). The bit size controller may be unified with the channel coding block 165. A signal output from the bit size controller is scrambled (167). Scrambling may be performed in a layer-specific, codeword-specific or UE-specific manner.

The bit size controller can operate as follows.

(1) The bit size controller recognizes the rank (n_rank_pusch) of data regarding a PUSCH.

(2) The rank (n_rank_control) of a control channel is set to equal to the data rank (i.e. n_rank_control=n_rank_pusch) and the number (n_bit_crtl) of bits corresponding to the control channel is extended by being multiplied by the rank of the control channel.

To achieve this, the control channel may be copied repeatedly. In this case, the control channel may correspond to an information level before channel coding or to an encoded bit level after channel coding. Given a control channel [a0, a1, a2, a3] having n_bit_ctrl=4, and n_rank_pusch=2, the extended number of bits, n_ext_ctrl is 8, that is, [a0, a1, a2, a3, a0, a1, a2, a3].

Provided that the bit size controller and the channel coding block are unified, encoded bits can be generated using channel coding and rate matching defined in the legacy system (e.g. LTE Rel-8).

In addition to the bit size controller, bit level interleaving may be performed to further randomize layers. Otherwise, equivalent interleaving may be carried out at a modulation symbol level.

The CQI/PMI channel and data regarding 2 codewords may be multiplexed by a data/control multiplexer (164). ACK/NACK information is mapped to REs adjacent to an uplink DM-RS in both slots in a subframe, and a channel interleaver maps the CQI/PMI according to a time-first mapping scheme (168).

Each layer is sequentially subjected to modulation (169), DFT precoding (170), MIMO precoding (171), and mapping to REs (172) to generate an SC-FDMA signal which is then transmitted through an antenna port (173).

The above-mentioned functional blocks are not limited to the positions shown in FIG. 19 and the positions thereof may be changed as necessary. For example, scrambling blocks 162 and 167 can be located after the channel interleaver block 168 and the codeword-to-layer mapping block 163 can be located after the channel interleaver block 168 or the modulation mapper block 169.

UCI and data are transmitted on a PUSCH using the following scheme. The location of the UCI on the PUSCH is described first.

CQI is mapped, being contiguous to the data, to REs other than REs to which an RI is mapped using the same modulation order and constellation as those of the data in a time-first mapping manner. In case of SU-MIMO, CQI is spread in a codeword and transmitted. The codeword carrying the CQI corresponds to one of two codewords, which has a higher MCS level. If the two codewords have the same MCS level, codeword 0 carries the CQI. ACK/NACK is located in symbols adjacent to both sides of an RS, puncturing the contiguous CQI and data previously mapped to symbols adjacent to the RS. Since the RS is located in third and tenth symbols, the ACK/NACK is mapped to second, fourth, ninth and eleventh symbols from the lowest subcarrier. Here, the ACK/NACK is mapped in the order of second, eleventh, ninth and fourth symbols. An RI is mapped to symbols located adjacent to the ACK/NACK. The RI is mapped first from among information (data, CQI, ACK/NACK and RI) transmitted on the PUSCH. Specifically, the RI is mapped to symbols from the lowest subcarrier of the first, fifth, eighth and twelfth symbols. Here, the RI is mapped in the order of the first, twelfth, eighth and fifth symbols. The ACK/NACK and RI can be mapped using only four corners of a constellation through QPSK, for example, in case of an information bit of 1 bit or 2 bits, and mapped using all constellations of the same modulation order as that of the data in case of an information bit of 3 bits or more. The ACK/NACK and RI carry the same information using the same resource in the same position in all layers.

A description will be given of a method for calculating the number or REs for UCI on a PUSCH. The number of REs for CQI and ACK/NACK (or RI) transmitted on a PUSCH can be computed according to Equations 12 and 13.

$$Q' = \min\left(\left\lceil \frac{(O+L) \cdot M_{sc}^{PUSCH-initial} \cdot N_{symb}^{PUSCH-initial} \cdot \beta_{offset}^{PUSCH}}{\sum_{r=0}^{C^{(x)}-1} K_r^{(x)}} \right\rceil, \right. \quad \text{[Equation 12]}$$

$$\left. M_{sc}^{PUSCH} \cdot N_{symb}^{PUSCH} - \frac{Q_{RI}}{Q_m} \right)$$

$$Q' = \min\left(\left\lceil \frac{O \cdot M_{sc}^{PUSCH-initial(1)} \cdot N_{symb}^{PUSCH-initial(1)} \cdot M_{sc}^{PUSCH-initial(2)} \cdot N_{symb}^{PUSCH-initial(2)} \cdot \beta_{offset}^{PUSCH}}{\sum_{r=0}^{C^{(1)}-1} K_r^{(1)} \cdot M_{sc}^{PUSCH-initial(2)} \cdot N_{symb}^{PUSCH-initial(2)} + \sum_{r=0}^{C^{(2)}-1} K_r^{(2)} \cdot M_{sc}^{PUSCH-initial(1)} \cdot N_{symb}^{PUSCH-initial(1)}} \right\rceil, \right.$$

$$\left. 4 \cdot M_{sc}^{PUSCH} \right) \quad \text{[Equation 13]}$$

The number of REs for the CQI and ACK/NACK (or RI) can be represented as the number of coded modulation symbols.

A description will be given of a channel coding method for UCI transmitted on a PUSCH. Given CQI having a payload size of 11 bits or fewer, RM (Reed-Muller) coding using the following table 1 is applied to an input sequence (i.e. information data), $O_0, O_1, O_2, \ldots, O_{O-1}$ to generate a 32-bit output sequence. In case of CQI having a payload size of greater than 11 bits, an 8-bit CRC is attached to the CQI and then TBCC (Tail Biting Convolutional Coding) is applied thereto.

A description will be given of channel coding of ACK/NACK and RI transmitted on a PUSCH. Provided that the ACK/NACK and RI have an information bit size of 1 bit, that is, an input sequence is $[O_0^{UCI}]$, channel coding is performed according to modulation order Qm as shown in the following table 2. When the ACK/NACK and RI have an information bit size of 2 bits, that is, an input sequence is $[O_0^{UCI} O_1^{UCI}]$, channel coding is performed according to a modulation order as shown in the following table 3. In Table 3, particularly, $O_0^{UCI}$ corresponds to ACK/NACK or RI data for codeword 0, $O_1^{UCI}$ corresponds to ACK/NACK or RI data for codeword 1, and $O_2^{UCI}$ is $(O_0^{UCI}+O_1^{UCI})$mod 2. In Tables 2 and 3, x is 1 and y means repetition of the preceding value.

If the ACK/NACK and RI have an information data size of larger than 3 bits and smaller than 11 bits, however, RM coding using Table 1 is applied to generate a 32-bit output sequence.

TABLE 1

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 0 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

TABLE 2

| $Q_m$ | Encoded HARQ-ACK/RI |
|---|---|
| 2 | $[o_0^{UCI} y]$ |
| 4 | $[o_0^{UCI} y \ x \ x]$ |
| 6 | $[o_0^{UCI} y \ x \ x \ x \ x]$ |

TABLE 3

| $Q_m$ | Encoded HARQ-ACK/RI |
|---|---|
| 2 | $[o_0^{UCI} o_1^{UCI} o_2^{UCI} o_0^{UCI} o_1^{UCI} o_2^{UCI}]$ |
| 4 | $[o_0^{UCI} o_1^{UCI} x \ x \ o_2^{UCI} o_0^{UCI} x \ x \ o_1^{UCI} o_2^{UCI} x \ x]$ |
| 6 | $[o_0^{UCI} o_1^{UCI} x \ x \ x \ x \ o_2^{UCI} o_0^{UCI} x \ x \ x \ x \ o_1^{UCI} o_2^{UCI} x \ x \ x \ x]$ |

In case of RM coding using Table 1, output data $b_0, b_1, b_2, b_3, \ldots, b_{B-1}$ is represented by Equation 14 (B is being 32).

$$b_i = \sum_{n=0}^{O-1} (o_n \cdot M_{i,n}) \bmod 2 \qquad \text{[Equation 14]}$$

Finally, rate matching can be performed to map UCI coded into B-bit data, i.e. ACK/NACK or RI data to Q' REs, which is calculated according to Equations 12 and 13, according to Equation 15.

$$q_i = b_{i \bmod B}, \ i=0, 1, \ldots, Q_m \times Q'-1 \qquad \text{[Equation 15]}$$

Channel coding of control information on a PUSCH is described in detail in section 5.2.2.6 of 3GPP TS 36.212. Channel coding of CQI/PMI information on a PUSCH is described in detail in section 5.2.2.6.4 of 3GPP TS 36.212. In addition, multiplexing of data and control information on a PUSCH is described in detail in section 5.2.2.7 of 3GPP TS 36.212. Further, channel interleaving on a PUSCH is described in detail in section 5.2.2.8 of 3GPP TS 36.212.

Transmission of Control Information on PUCCH

CQI, PMI, RI and a combination of CQI and ACK/NACK can be transmitted according to PUCCH format 2/2a/2b. In this case, RM channel coding can be employed.

For example, channel coding for UCI CQI in a 3GPP LTE system is described as follows. A bitstream $a_0, a_1, a_2, a_3, \ldots, a_{A-1}$ is inserted into a channel coding block using (20, A) RM code. Table 4 shows a basic sequence for (20, A) code.

TABLE 4

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |

TABLE 4-continued

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 2 | 1 | 0 | 0 | 1 | 0 | 0 | 1 | 0 | 1 | 1 | 1 | 1 | 1 |
| 3 | 1 | 0 | 1 | 1 | 1 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 0 | 0 | 0 | 0 | 0 | 0 |
| 19 | 1 | 0 | 0 | 0 | 0 | 1 | 1 | 0 | 0 | 0 | 0 | 0 | 0 |

Channel coding bits of $b_0, b_1, b_2, b_3, \ldots, b_{B-1}$ can be generated according to Equation 16.

$$b_i = \sum_{n=0}^{A-1}(a_n \cdot M_{i,n}) \bmod 2 \quad \text{[Equation 16]}$$

In Equation 16, i=0, 1, 2, . . . , B−1.

For detailed description of channel coding of UCI CQI, refer to section 5.2.3.3 of 3GPP TS 36.212.

Modulation Mapper

A modulation mapper (e.g. the modulation mapper 169 shown in FIG. 19) may be configured to operate as follows.

The modulation mapper takes binary digits, 0 or 1, as input and produces complex-valued modulation symbols, x=I+jQ, as output. A description will be given of BPSK (Binary Phase Shift Keying), QPSK (Quadrature PSK), 16QAM (16 Quadrature Amplitude Modulation) and 64QAM in detail.

In case of BPSK modulation, a single bit, No, is mapped to a complex-valued modulation symbol x=I+jQ according to Table 5.

TABLE 5

| b(i) | I | Q |
|---|---|---|
| 0 | $1/\sqrt{2}$ | $1/\sqrt{2}$ |
| 1 | $-1/\sqrt{2}$ | $-1/\sqrt{2}$ |

In case of QPSK modulation, pairs of bits, b(i),b(i+1), are mapped to complex-valued modulation symbols x=I+jQ according to Table 6.

TABLE 6

| b(i), b(i + 1) | I | Q |
|---|---|---|
| 00 | $1/\sqrt{2}$ | $1/\sqrt{2}$ |
| 01 | $1/\sqrt{2}$ | $-1/\sqrt{2}$ |
| 10 | $-1/\sqrt{2}$ | $1/\sqrt{2}$ |
| 11 | $-1/\sqrt{2}$ | $-1/\sqrt{2}$ |

In case of 16QAM modulation, quadruplets of bits, b(i),b(i+1),b(i+2),b(i+3), are mapped to complex-valued modulation symbols x=I+jQ according to Table 7.

TABLE 7

| b(i), b(i + 1), b(i + 2), b(i + 3) | I | Q |
|---|---|---|
| 0000 | $1/\sqrt{10}$ | $1/\sqrt{10}$ |
| 0001 | $1/\sqrt{10}$ | $3/\sqrt{10}$ |
| 0010 | $3/\sqrt{10}$ | $1/\sqrt{10}$ |
| 0011 | $3/\sqrt{10}$ | $3/\sqrt{10}$ |
| 0100 | $1/\sqrt{10}$ | $-1/\sqrt{10}$ |
| 0101 | $1/\sqrt{10}$ | $-3/\sqrt{10}$ |
| 0110 | $3/\sqrt{10}$ | $-1/\sqrt{10}$ |
| 0111 | $3/\sqrt{10}$ | $-3/\sqrt{10}$ |
| 1000 | $-1/\sqrt{10}$ | $1/\sqrt{10}$ |
| 1001 | $-1/\sqrt{10}$ | $3/\sqrt{10}$ |
| 1010 | $-3/\sqrt{10}$ | $1/\sqrt{10}$ |
| 1011 | $-3/\sqrt{10}$ | $3/\sqrt{10}$ |
| 1100 | $-1/\sqrt{10}$ | $-1/\sqrt{10}$ |
| 1101 | $-1/\sqrt{10}$ | $-3/\sqrt{10}$ |
| 1110 | $-3/\sqrt{10}$ | $-1/\sqrt{10}$ |
| 1111 | $-3/\sqrt{10}$ | $-3/\sqrt{10}$ |

In case of 64QAM modulation, hextuplets of bits, b(i),b(i+1),b(i+2),b(i+3),b(i+4),b(i+5), are mapped to complex-valued modulation symbols x=I+jQ according to Table 8.

TABLE 8

| b(i), b(i + 1), b(i + 2), b(i + 3), b(i + 4), b(i + 5) | I | Q |
|---|---|---|
| 000000 | $3/\sqrt{42}$ | $3/\sqrt{42}$ |
| 000001 | $3/\sqrt{42}$ | $1/\sqrt{42}$ |
| 000010 | $1/\sqrt{42}$ | $3/\sqrt{42}$ |
| 000011 | $1/\sqrt{42}$ | $1/\sqrt{42}$ |
| 000100 | $3/\sqrt{42}$ | $5/\sqrt{42}$ |
| 000101 | $3/\sqrt{42}$ | $7/\sqrt{42}$ |
| 000110 | $1/\sqrt{42}$ | $5/\sqrt{42}$ |
| 000111 | $1/\sqrt{42}$ | $7/\sqrt{42}$ |
| 001000 | $5/\sqrt{42}$ | $3/\sqrt{42}$ |
| 001001 | $5/\sqrt{42}$ | $1/\sqrt{42}$ |
| 001010 | $7/\sqrt{42}$ | $3/\sqrt{42}$ |
| 001011 | $7/\sqrt{42}$ | $1/\sqrt{42}$ |
| 001100 | $5/\sqrt{42}$ | $5/\sqrt{42}$ |
| 001101 | $5/\sqrt{42}$ | $7/\sqrt{42}$ |
| 001110 | $7/\sqrt{42}$ | $5/\sqrt{42}$ |
| 001111 | $7/\sqrt{42}$ | $7/\sqrt{42}$ |
| 010000 | $3/\sqrt{42}$ | $-3/\sqrt{42}$ |
| 010001 | $3/\sqrt{42}$ | $-1/\sqrt{42}$ |
| 010010 | $1/\sqrt{42}$ | $-3/\sqrt{42}$ |
| 010011 | $1/\sqrt{42}$ | $-1/\sqrt{42}$ |
| 010100 | $3/\sqrt{42}$ | $-5/\sqrt{42}$ |
| 010101 | $3/\sqrt{42}$ | $-7/\sqrt{42}$ |
| 010110 | $1/\sqrt{42}$ | $-5/\sqrt{42}$ |

TABLE 8-continued

| b(i), b(i + 1), b(i + 2), b(i + 3), b(i + 4), b(i + 5) | I | Q |
|---|---|---|
| 010111 | $1/\sqrt{42}$ | $-7/\sqrt{42}$ |
| 011000 | $5/\sqrt{42}$ | $-3/\sqrt{42}$ |
| 011001 | $5/\sqrt{42}$ | $-1/\sqrt{42}$ |
| 011010 | $7/\sqrt{42}$ | $-3/\sqrt{42}$ |
| 011011 | $7/\sqrt{42}$ | $-1/\sqrt{42}$ |
| 011100 | $5/\sqrt{42}$ | $-5/\sqrt{42}$ |
| 011101 | $5/\sqrt{42}$ | $-7/\sqrt{42}$ |
| 011110 | $7/\sqrt{42}$ | $-5/\sqrt{42}$ |
| 011111 | $7/\sqrt{42}$ | $-7/\sqrt{42}$ |
| 100000 | $-3/\sqrt{42}$ | $3/\sqrt{42}$ |
| 100001 | $-3/\sqrt{42}$ | $1/\sqrt{42}$ |
| 100010 | $-1/\sqrt{42}$ | $3/\sqrt{42}$ |
| 100011 | $-1/\sqrt{42}$ | $1/\sqrt{42}$ |
| 100100 | $-3/\sqrt{42}$ | $5/\sqrt{42}$ |
| 100101 | $-3/\sqrt{42}$ | $7/\sqrt{42}$ |
| 100110 | $-1/\sqrt{42}$ | $5/\sqrt{42}$ |
| 100111 | $-1/\sqrt{42}$ | $7/\sqrt{42}$ |
| 101000 | $-5/\sqrt{42}$ | $3/\sqrt{42}$ |
| 101001 | $-5/\sqrt{42}$ | $1/\sqrt{42}$ |
| 101010 | $-7/\sqrt{42}$ | $3/\sqrt{42}$ |
| 101011 | $-7/\sqrt{42}$ | $1/\sqrt{42}$ |
| 101100 | $-5/\sqrt{42}$ | $5/\sqrt{42}$ |
| 101101 | $-5/\sqrt{42}$ | $7/\sqrt{42}$ |
| 101110 | $-7/\sqrt{42}$ | $5/\sqrt{42}$ |
| 101111 | $-7/\sqrt{42}$ | $7/\sqrt{42}$ |
| 110000 | $-3/\sqrt{42}$ | $-3/\sqrt{42}$ |
| 110001 | $-3/\sqrt{42}$ | $-1/\sqrt{42}$ |
| 110010 | $-1/\sqrt{42}$ | $-3/\sqrt{42}$ |
| 110011 | $-1/\sqrt{42}$ | $-1/\sqrt{42}$ |
| 110100 | $-3/\sqrt{42}$ | $-5/\sqrt{42}$ |
| 110101 | $-3/\sqrt{42}$ | $-7/\sqrt{42}$ |
| 110110 | $-1/\sqrt{42}$ | $-5/\sqrt{42}$ |
| 110111 | $-1/\sqrt{42}$ | $-7/\sqrt{42}$ |
| 111000 | $-5/\sqrt{42}$ | $-3/\sqrt{42}$ |
| 111001 | $-5/\sqrt{42}$ | $-1/\sqrt{42}$ |
| 111010 | $-7/\sqrt{42}$ | $-3/\sqrt{42}$ |
| 111011 | $-7/\sqrt{42}$ | $-1/\sqrt{42}$ |
| 111100 | $-5/\sqrt{42}$ | $-5/\sqrt{42}$ |
| 111101 | $-5/\sqrt{42}$ | $-7/\sqrt{42}$ |
| 111110 | $-7/\sqrt{42}$ | $-5/\sqrt{42}$ |
| 111111 | $-7/\sqrt{42}$ | $-7/\sqrt{42}$ |

Representation of bit values on (I, Q) plane according to values I and Q of Tables 5 to 8 is called constellation.

Transmission of Rank Information

In the legacy system, because MIMO transmission through up to 4 Tx antennas is performed on downlink, a rank value is one of 1 to 4 and a maximum size of rank information is 2 bits. The aforementioned channel coding method is applicable to an RI having up to 2 bits. If an extended antenna configuration or a multi-carrier (i.e. carrier aggregation) scheme is applied to downlink transmission, the size of RI increases. For example, when a rank value is one of 1 to 8 for a single carrier, the size of RI needs to have up to 3 bits. When it is necessary to transmit rank information regarding a plurality of carriers, the size of rank information that needs to be transmitted through an uplink channel increases. The present invention proposes a coding scheme for transmitting rank information having an increased size and RI transmission timing (the position of an RI in an uplink transmission frame).

As described above, a control channel (e.g. PUCCH) and a data channel (e.g. PUSCH) can be used for transmission of UCI in the legacy system. A (20, A) block code is used when channel information is reported using a control channel (refer to Table 4), whereas a (32, A) block code is used when channel information is reported using a data channel (refer to Table 1). A receiver measures a channel state and reports a rank suitable for transmission to a transmitter. Since PMI and CQI information is defined according to rank information, it is important to improve reliability of rank information transmission. The above-mentioned block codes can be used for rank information transmission.

In a system using N Tx antennas, up to N independent layers can be transmitted, and a maximum transmission rank value is determined according to the state of a receiver. For example, a transmitter having 8 antennas can transmit up to 8 layers. In this case, a receiver having 2 antennas can receive up to 2 layers while discriminating the 2 layers from each other and a receiver having 4 antennas can receive up to 4 layers while discriminating the 4 antennas from one another. Further, a receiver having 8 antennas can receive up to 8 independent layers.

An RI may be represented in bits. That is, an RI can be represented in 1 bit in case of a maximum rank of 2, represented in 2 bits in case of a maximum rank of 4 and represented in 3 bits in case of a maximum rank of 8. Table 9 shows exemplary representation of ranks 1 to 8 in 3 bits.

TABLE 9

|  | Rank |
|---|---|
| 000 | 1 |
| 001 | 2 |
| 010 | 3 |
| 011 | 4 |
| 100 | 5 |
| 101 | 6 |
| 110 | 7 |
| 111 | 8 |

Channel Coding of Rank Information

In a first embodiment, when rank information is transmitted using a control channel (e.g. PUCCH), rank information bits can be encoded using a (20, 3) block code of Table 4.

In a second embodiment, when rank information is transmitted through a data channel (e.g. PUSCH), rank information bits can be encoded using a (32, 3) block code of Table 1. A result of coding of 3-bit rank information using a (32, 3) block code can be represented as '01 10 10 01 01 10 10 11 01 00 11 10 01 00 11', for example. For modulation of this bitstream in a 32-bit length, the bits of the bitstream can be grouped as shown in Table 10 and mapped to a constellation.

TABLE 10

| Qm | symbols |  |
|---|---|---|
| 2 | 16 | [01] [10] [10] [01] [00] [01] [10] [10] [11] [01] [00] [11] [10] [01] [00] [11] |
| 4 | 8 | [01 10] [10 01] [00 01] [10 10] [11 01] [00 11] [10 01] [00 11] |
| 6 | 6 | [01 10 10] [01 00 01] [10 10 11] [01 00 11] [10 01 00] [11 01 10] |

The number of REs used for RI transmission in a data channel may be smaller or larger than the number of modulated symbols acquired by modulating bits encoded using a (32, A) block code. In this case, the bits encoded using a block code can be rate-matched to the number of REs used for transmission.

In a third embodiment, when rank information is delivered through a data channel, rank bits can be encoded using a repeated code. Repeated encoded bits can be modulated through a modulation block. A modulation order is determined according to a modulation order for data transmission. A description will be given of repeated coding and modulation of an information bitstream.

A method of simply repeating an information bitstream can be applied as a repeated coding scheme. Given 3-bit information bitstreams, d0=000 and d1=010, when 6-bit data is required, repeated coding results are c0=000000 and c1=010010.

For repetition of an information bitstream, a scheme of performing bit inversion and combining the original information bitstream and bit-inverted information bitstream can be used. Here, bit inversion may be implemented through an XOR operation or modular operation. For example, bit inversion of b0 can be achieved through 'b0 xor 1' or '(b0+1)mod 2'.

Bit inversion can be performed by two methods. One method performs bit inversion on an information block in which the number of 1s included in an information bitstream is odd. The other performs bit inversion on an information block in which the number of 1s included in an information bitstream is even.

Combination of an information bitstream and an inverted information bitstream can be achieved by two methods. One method arranges the original information bitstream as MSBs (Most Significant Bits) and locates inverted information bitstream as LSBs (Least Significant Bits). The other arranges the inverted information bitstream as MSBs and locates the original information bitstream as LSBs.

Provided that odd-number based bit inversion and the scheme of locating an inverted information bitstream as MSBs are applied to 3-bit information bitstreams, d0=000 and d1=010, c0=000000 and c1=101010 are obtained as results of repeated coding. If even-number based bit inversion and the scheme of locating an inverted information bitstream as LSBs are applied to 3-bit information bitstreams, d0=000 and d1=010, c0=000111 and c1=010010 are obtained as results of repeated coding.

An encoded bitstream obtained as a repeated coding result may be interleaved (or the location of the encoded bitstream may be changed). Interleaving may be performed on a bit-by-bit basis, performed in the unit of bit blocks according to a modulation order, or carried out based on a repeated block on a block-by-block basis.

Rate matching may be performed on the encoded bits according to the size of transmitted REs. For rate matching, bits corresponding to LSBs may be punctured. Otherwise, bits corresponding to MSBs may be punctured or some arbitrary bits may be punctured according to a predetermined rule.

The encoded bits may be modulated using only part of a constellation. For example, modulation can be performed using only the end of the constellation. In case of QPSK, 4 constellation positions are used. In case of 16QAM and 64QAM, 4 constellation positions farthest away from the zero point of I-Q plane can be used.

In case of 16QAM and 64QAM, it can be considered to use 4 constellation positions as shown in Tables 11 and 12 from constellations according to I and Q values of Tables 7 and 8.

TABLE 11

| b(i), b(i + 1), b(i + 2), b(i + 3) | I | Q |
| --- | --- | --- |
| 0011 | $3/\sqrt{10}$ | $3/\sqrt{10}$ |
| 0111 | $3/\sqrt{10}$ | $-3/\sqrt{10}$ |
| 1011 | $-3/\sqrt{10}$ | $3/\sqrt{10}$ |
| 1111 | $-3/\sqrt{10}$ | $-3/\sqrt{10}$ |

TABLE 12

| b(i), b(i + 1), b(i + 2), b(i + 3), b(i + 4), b(i + 5) | I | Q |
| --- | --- | --- |
| 001111 | $7/\sqrt{42}$ | $7/\sqrt{42}$ |
| 011111 | $7/\sqrt{42}$ | $-7/\sqrt{42}$ |
| 101111 | $-7/\sqrt{42}$ | $7/\sqrt{42}$ |
| 111111 | $-7/\sqrt{42}$ | $-7/\sqrt{42}$ |

For transmission of an RI, 3 bits are necessary to represent a maximum rank of 8. A description will be given of encoding and modulation of 3-bit RI information.

When an RI is composed of 3-bit information, $[O_0^{RI} O_1^{RI} O_2^{RI}]$ ($O_0^{RI}$ corresponds to an MSB of the 3-bit information and $O_2^{RI}$ corresponds to an LSB thereof), the RI is encoded according to Table 13.

TABLE 13

| $Q_m$ | Encoded RI |
| --- | --- |
| 2 | $[O_0^{RI} O_1^{RI} O_2^{RI} O_3^{RI} O_4^{RI} O_5^{RI}]$ |
| 4 | $[O_0^{RI} O_1^{RI} x x O_2^{RI} O_3^{RI} x x O_4^{RI} O_5^{RI} x x]$ |
| 6 | $[O_0^{RI} O_1^{RI} x x x x O_2^{RI} O_3^{RI} x x x x O_4^{RI} O_5^{RI} x x x x]$ |
| | x = 1 |

In Table 13, $O_3^{RI}$, $O_4^{RI}$ and $O_5^{RI}$ are determined by Equation 17.

If $(O_0^{RI}+O_1^{RI}+O_2^{RI})$mod 2==0 or $(O_0^{RI}$ xor $O_1^{RI}$ xor $O_2^{RI})$==0

$O_3^{RI}=O_0^{RI}$ $O_4^{RI}=O_1^{RI}$ $O_5^{RI}=O_2^{RI}$ else if $(O_0^{RI}+O_1^{RI}+O_2^{RI})$mod 2==1 or $(O_0^{RI}$ xor $O_1^{RI}$ xor $O_2^{RI})$==1

$O_3^{RI}=(O_0^{RI}+1)$mod 2 or $O_3^{RI}=(O_0^{RI}$ xor 1)

$O_4^{RI}=(O_1^{RI}+1)$mod 2 or $O_4^{RI}=(O_1^{RI}$ xor 1)

$O_5^{RI}=(O_2^{RI}+1)$mod 2 or $O_5^{RI}=(O_2^{RI}$ xor 1) end  [Equation 17]

When $(O_0^{RI}+O_1^{RI}+O_2^{RI})$mod 2==0 or $(O_0^{RI}$ xor $O_1^{RI}$ xor $O_2^{RI})$==0 in Equation 17, this represents that the number of 1s in the 3-bit RI information bitstream, $O_0^{RI} O_1^{RI} O_2^{RI}$, is an even number. If $(O_0^{RI}+O_1^{RI}+O_2^{RI})$mod 2==1 or $(O_0^{RI}$ xor $O_1^{RI}$ xor $O_2^{RI})$==1 in Equation 17, this means that the number of 1s in the 3-bit RI information bitstream, $[O_0^{RI} O_1^{RI} O_2^{RI}]$, is an odd number. When $O_3^{RI}=(O_0^{RI}+1)$mod 2 or $O_3^{RI}=(O_0^{RI}$ xor 1) in Equation 17, this represents that bit inversion is performed on $O_0^{RI}$.

Results of equation 17 can be arranged as shown in Table 14.

TABLE 14

| Information bit $O_0^{RI} O_1^{RI} O_2^{RI}$ | Encoded bit $O_0^{RI} O_1^{RI} O_2^{RI} O_3^{RI} O_4^{RI} O_5^{RI}$ | Information bit $O_0^{RI} O_1^{RI} O_2^{RI}$ | Encoded bit $O_0^{RI} O_1^{RI} O_2^{RI} O_3^{RI} O_4^{RI} O_5^{RI}$ |
| --- | --- | --- | --- |
| 000 | 00 00 00 | 001 | 00 11 10 |
| 010 | 01 00 10 | 011 | 01 11 00 |
| 101 | 10 11 01 | 111 | 11 10 00 |

Figure 20:
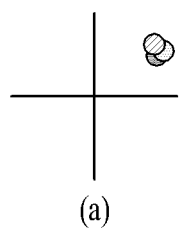
FIG. 20 shows results of modulation of encoded bits, represented as constellations, according to an embodiment of the present invention.
Figure 20:
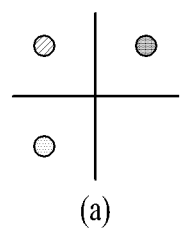
Figure 20:
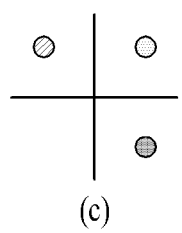
Figure 20:
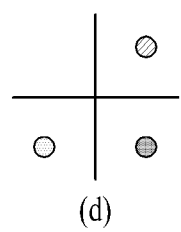
Figure 20:
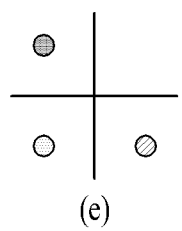
Figure 20:
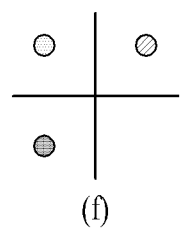

FIG. 20 shows results of modulation of encoded bits of FIG. 14, represented as constellations. Encoded bits [00 00 00] of Table 14 are mapped to a constellation of FIG. 20(a), encoded bits [00 11 10] are mapped to a constellation of FIG. 20(b), encoded bits [01 00 10] are mapped to a constellation of FIG. 20(c), encoded bits [01 11 00] are mapped to a constellation of FIG. 20(d), encoded bits [10 11 01] are mapped to a constellation of FIG. 20(e), and encoded bits [11 10 00] are mapped to a constellation of FIG. 20(f).

While encoding and modulation of a 3-bit RI have been described in the above-mentioned embodiments of the present invention, the present invention is applicable to encoding and modulation of an RI of 3 bits or more.

Furthermore, while encoding and modulation of RI information bits have been described in the aforementioned embodiments, the present invention can be applied to other control information. For example, the above-described encoding and modulation schemes can be applied to transmission of ACK/NACK information of 3 bits or more.

Location of Virtual Resource of Rank Information

As described with reference to FIG. 17, when uplink control information is mapped to a PUSCH resource in the legacy system (e.g. 3GPP LTE release-8), RSs are located at SC-FDMA symbol indexes 3 and 10, ACK/NACK information is mapped to symbols on both sides of an RS, and an RI is mapped to symbols adjacent to each ACK/NACK in case of normal CP. Specifically, RIs are mapped to SC-FDMA symbols from among 14 SC-FDMA symbols (corresponding to SC-FDMA symbol indexes 0 to 13) of a subframe in the order of SC-FDMA symbols indexes 1, 12, 8 and 5 in case of normal CP.

In a subframe configuration of normal CP, data/control information are mapped to 12 SC-FDMA symbols except SC-FDMA symbols to which RSs are mapped. In this case, the SC-FDMA symbols other than RS transmission symbols can be indicated by column indexes 0 to 11. Under this assumption, SC-FDMA symbols (or columns) to which RIs are mapped in an uplink subframe can be arranged as shown in Table 15.

TABLE 15

| CP configuration | Column Set |
| --- | --- |
| Normal | {1, 4, 7, 10} |
| Extended | {0, 3, 5, 8} |

Figures 21, 22:
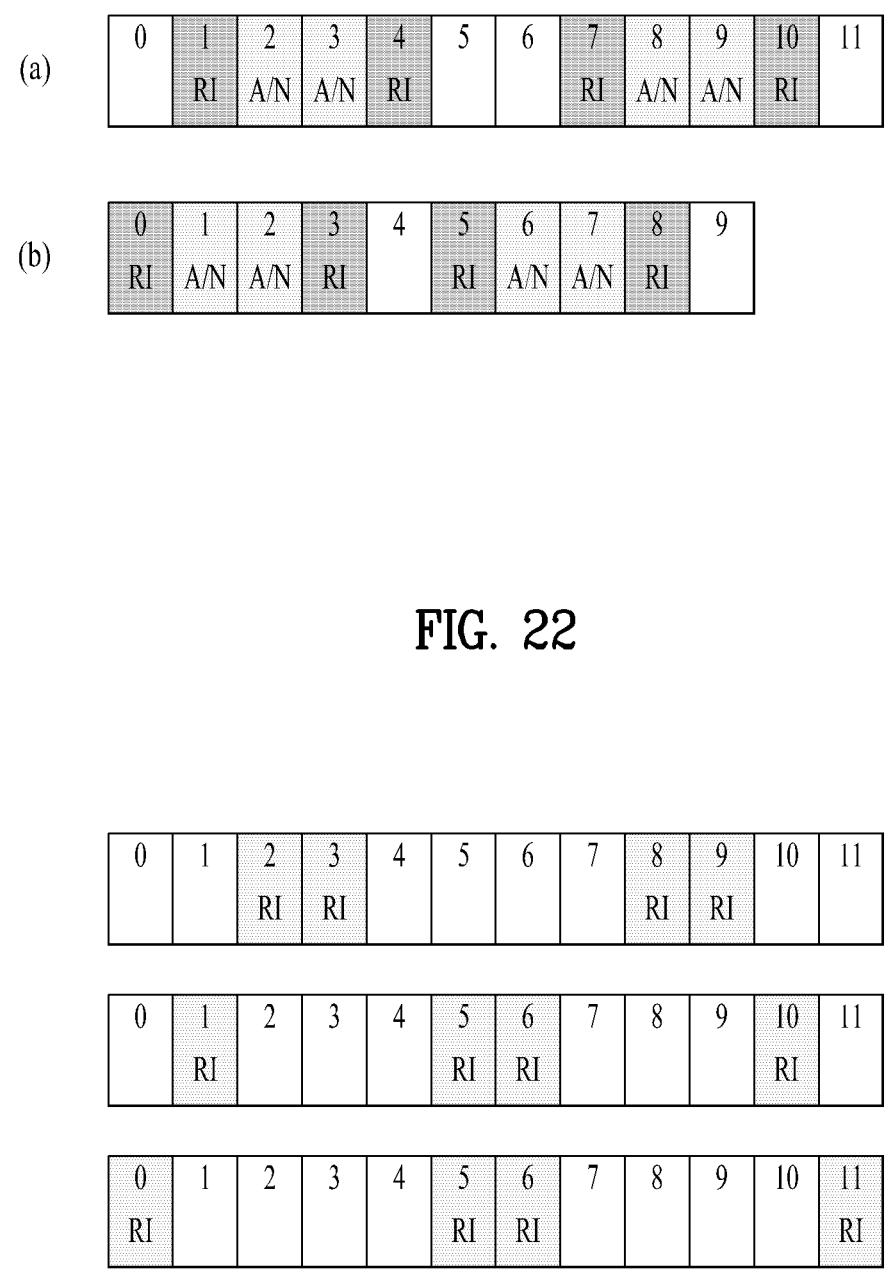

FIG. 21 shows SC-FDMA symbol positions to which uplink control information is mapped on a PUSCH. FIG. 21(a) shows a normal CP case and FIG. 21(b) shows an extended CP case. FIG. 21 shows symbols other than RS transmission symbols, as described above with reference to Table 15. Uplink control information transmission SC-FDMA symbols of FIG. 21 are transmitted after being time-division-multiplexed with DRMS transmission symbols. Provided that SRS transmission is set in an uplink subframe, the last symbol of the SC-FDMA symbols of FIG. 21 can be used for SRS transmission.

FIGS. 22 and 23 show symbol positions to which rank information is mapped. FIG. 22 corresponds to a normal CP case and FIG. 23 corresponds to an extended CP case.

Referring to FIGS. 22 and 23, symbol positions to which RIs are mapped can be newly defined, compared to the conventional system (refer to FIG. 21). RI transmission symbol positions are newly defined because the size of RI information increases or the size of ACK/NACK information increases. For example, when carrier aggregation is employed for downlink transmission, the quantity of ACK/NACK information that needs to be transmitted through an uplink may increases, compared to single carrier transmission. In view of this, time positions to which RIs are mapped may be changed. Configuration of RIs transmitted in newly defined time positions may be signaled by a higher layer signal.

Figure 24:
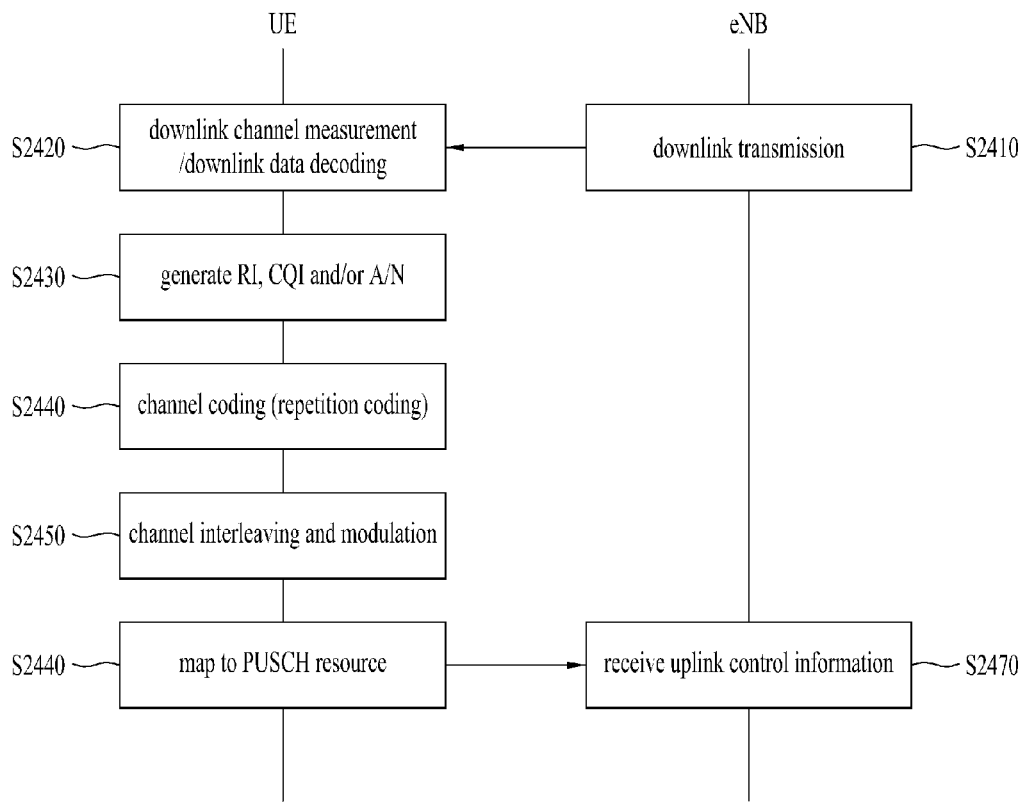
FIG. 24 is a flowchart illustrating a method for transmitting uplink control information according to an embodiment of the present invention.

FIG. 24 is a flowchart illustrating a method for transmitting uplink control information according to an embodiment of the present invention.

An eNB may transmit a downlink signal and a UE may receive the downlink signal (S2410). The downlink signal may include an RS (CRS) for downlink channel measurement and/or channel state information (CSI)-reference signal (CRI-RS), downlink data, etc. The UE may measure a downlink channel on the basis of a downlink RS and attempt to decode the received downlink data (S2420).

The UE may select a rank value (RI) suitable for the downlink channel and calculate downlink channel quality (CQI) on the basis of the rank value (S2430). In addition, the UE may generate HARQ-ACK/NACK information according to whether a downlink data packet has been successfully decoded. RI, CQI, and HARQ-ACK/NACK information may be commonly called uplink control information (UCI).

The UE may perform channel coding on the generated UCI (S2440). Here, the channel coding schemes according to embodiments of the present invention can be applied. Especially, the repeated coding scheme can be used. Encoded UCI bits are generated as a channel coding result.

The UE may perform channel interleaving, rate matching and modulation on the encoded bits (S2450). Here, interleaving, rate matching and modulation schemes according to the embodiments of the present invention can be applied.

The UE may map modulated symbols of the UCI to a PUSCH resource and transmit the mapped symbols to the eNB (S2460). The eNB may receive the UCI and perform an operation based on the UCI (S2470). For example, the eNB can determine the number of downlink transmission layers, an MCS, etc. on the basis of an RI, CQI, etc. reported by the UE or perform retransmission of a data packet on the basis of the HARQ-ACK/NACK received from the UE.

In the method for transmitting uplink control information, described with reference to FIG. 24, the aforementioned various embodiments of the present invention can be independently applied or two or more embodiments can be applied together.

While the various embodiments of the present invention exemplarily use a BS as a downlink transmission entity and exemplarily use a UE as an uplink transmission entity, the scope or spirit of the present invention is not limited thereto. That is, even when a relay node (RN) may be used as a downlink transmission entity from a BS to a UE and/or be used as an uplink reception entity from a UE to a BS, or even when the RN may be used an uplink transmission entity for a UE or be used as a downlink reception entity from a BS, it should be noted that the embodiments of the present invention can be applied without difficulty.

Figure 25:
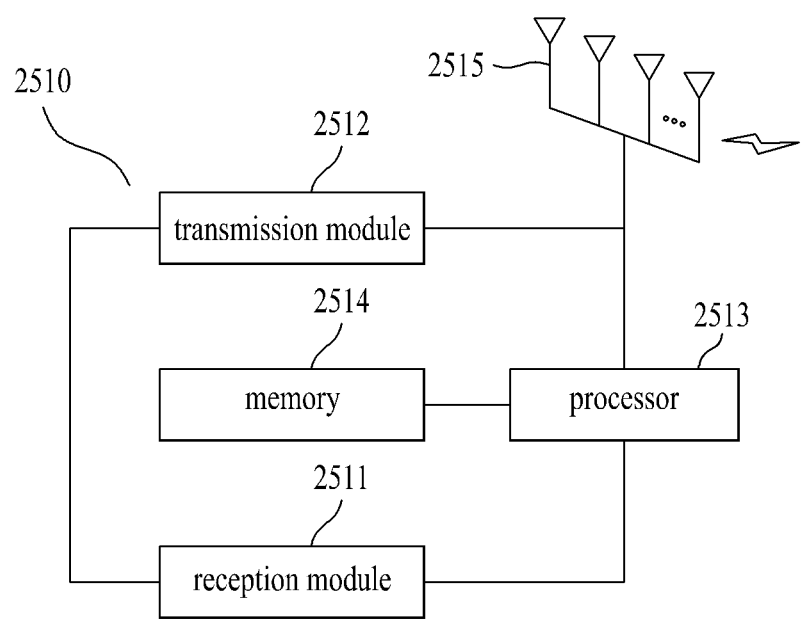
FIG. 25 illustrates the configuration of a transmitter according to an embodiment of the present invention.

FIG. 25 is a block diagram of a transmitter according to an embodiment of the present invention.

Referring to FIG. 25, a transmitter 2510 may include a reception module 2511, a transmission module 2512, a processor 2513, a memory 2514, and a plurality of antennas 2515. The plurality of antennas 2515 means that the transmitter 2510 supports MIMO transmission and reception. The reception module 2511 may receive various types of signals, data and information. The transmission module 2512 may transmit various types of signals, data and information. The processor 2513 may control the overall operation of the transmitter 2010.

The transmitter 2510 may be configured to transmit uplink control information. The processor 2513 of the transmitter 2510 may be configured to repeatedly encode N information bits to generate encoded bits. In addition, the processor 2513 may be configured to transmit the encoded bits through the transmission module 2512 over a PUSCH. In this case, bit inversion can be applied to repeated bits of the N information bits on the basis of the number of 1s included in the N information bits.

Additionally, the processor 2513 of the transmitter 2510 may process received information, information to be transmitted to the outside, etc. The memory 2514 may store information processed by the processor 2513 for a predetermined time and may be replaced with a component such as a buffer (not shown).

The transmitter 2510 may be configured such that the aforementioned various embodiments of the present invention can be independently applied or two or more embodiments can be applied together.

The transmitter 2510 may be a terminal that receives a downlink signal from an eNB and transmits an uplink signal to the eNB. Description of the transmitter 2510 can be equally applied to an RN as a downlink reception entity or an uplink transmission entity.

The embodiments of the present invention may be implemented by various means, for example, hardware, firmware, software, or combinations thereof.

When the embodiments of the present invention are implemented using hardware, the embodiments may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

It is obvious to those skilled in the art that claims that are not explicitly cited in each other in the appended claims may be presented in combination as an exemplary embodiment of the present invention or included as a new claim by subsequent amendment after the application is filed.

INDUSTRIAL APPLICABILITY

The above-described embodiments of the present invention can be applied to various mobile communication systems.

The invention claimed is:

1. A method for transmitting uplink control information in a wireless communication system, the method comprising:
    generating encoded bits by repeatedly coding N information bits, wherein N is a finite integer; and
    transmitting the encoded bits through a physical uplink shared channel (PUSCH),
    wherein bit inversion is applied to bits obtained by repeating the N information bits on the basis of the number of 1s included in the N information bits wherein the bits obtained by repeating the N information bits are located as most significant bits (MSBs) or least significant bits (LSBs) of the encoded bits, and
    wherein the N information bits are repeated when the number of 1s included in the N information bits is an even number, and the N information bits are inverted and then repeated when the number of 1s included in the N information bits is an odd number.

2. The method according to claim 1, wherein the encoded bits are interleaved on a bit-by-bit basis, on a bit block basis according to a modulation order, or on a repeated block basis.

3. The method according to claim 1, wherein the least significant bits (LSBs) of the encoded bits are punctured according to a size of a transmission resource element (RE).

4. The method according to claim 1, wherein a constellation of bits obtained by modulating the encoded bits is located farthest from a zero point of an I-Q plane.

5. The method according to claim 1, wherein N is 3 or larger.

6. The method according to claim 1, wherein the N information bits correspond to a rank indicator (RI) or Hybrid Automatic Repeat request(HARQ)—ACKnowledgement/Negative ACKnowledgement (ACK/NACK) information.

7. The method according to claim 1, wherein the N information bits are [$O_0$ $O_1$ $O_2$], the bits obtained by repeating the N information bits are [$O_3$ $O_4$ $O_5$], the encoded bits are [$O_0$ $O_1$ $O_2$ $O_3$ $O_4$ $O_5$] in case of a modulation order of 2, the encoded bits are [$O_0$ $O_1$ 1 1 $O_2$ $O_3$ 1 1 $O_4$ $O_5$ 1 1] in case of a modulation order of 4, and the encoded bits are [$O_0$ $O_1$ 1 1 1 1 $O_2$ $O_3$ 1 1 1 1 $O_4$ $O_5$ 1 1 1 1] in case of a modulation order of 6.

8. A User Equipment (UE) transmitting uplink control information in a wireless communication system, the UE comprising:
    a transmitter configured to transmit an uplink signal to an evolved Node B (eNB);
    a receiver configured to receive a downlink signal from the eNB; and
    a processor configured to control the receiver and the transmitter,
    wherein the processor is configured to generate encoded bits by repeatedly coding N information bits and to transmit the encoded bits through a physical uplink shared channel (PUSCH) wherein N is a finite integer,
    wherein bit inversion is applied to bits obtained by repeating the N information bits on the basis of the number of 1s included in the N information bits, wherein the bits obtained by repeating the N information bits are located as most significant bits (MSBs) or least significant bits (LSBs) of the encoded bits, and
    wherein the N information bits are repeated when the number of 1s included in the N information bits is an even number, and the N information bits are inverted and then repeated when the number of 1s included in the N information bits is an odd number.

* * * * *